US011281071B2

(12) United States Patent
Yu

(10) Patent No.: US 11,281,071 B2
(45) Date of Patent: Mar. 22, 2022

(54) CAMERA MODULE INCLUDING APERTURE

(71) Applicant: Samsung Electronics Co., Ltd., Suwon-si (KR)

(72) Inventor: Youngbok Yu, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/065,008

(22) Filed: Oct. 7, 2020

(65) Prior Publication Data

US 2021/0109421 A1 Apr. 15, 2021

(30) Foreign Application Priority Data

Oct. 14, 2019 (KR) .......................... 10-2019-0126996

(51) Int. Cl.
 *G03B 9/06* (2021.01)
(52) U.S. Cl.
 CPC ....................... *G03B 9/06* (2013.01)
(58) Field of Classification Search
 CPC ..................... G03B 9/02; G03B 9/06
 See application file for complete search history.

(56) References Cited

U.S. PATENT DOCUMENTS

| | | | | |
|---|---|---|---|---|
| 4,588,276 A | * | 5/1986 | Kaise | ...................... G03B 9/06 396/508 |
| 7,473,042 B2 | | 1/2009 | Kawaguchi | |
| 9,042,042 B2 | * | 5/2015 | Wade | ...................... G03B 5/00 359/824 |
| 9,807,312 B1 | | 10/2017 | Kim et al. | |
| 10,509,195 B2 | | 12/2019 | Lee | |
| 10,571,648 B2 | * | 2/2020 | Lee | .......................... G03B 5/02 |
| 2017/0324892 A1 | | 11/2017 | Kim et al. | |
| 2018/0164537 A1 | * | 6/2018 | Lee | ....................... G02B 13/001 |
| 2018/0164538 A1 | | 6/2018 | Lee | |
| 2018/0213137 A1 | | 7/2018 | Park et al. | |

(Continued)

FOREIGN PATENT DOCUMENTS

| | | |
|---|---|---|
| JP | H08-328080 A | 12/1996 |
| KR | 10-1128149 B1 | 3/2012 |

(Continued)

OTHER PUBLICATIONS

International Search Report dated Feb. 10, 2021, issued in International Application No. PCT/KR2020/013628.

*Primary Examiner* — Clayton E. LaBalle
*Assistant Examiner* — Leon W Rhodes, Jr.
(74) *Attorney, Agent, or Firm* — Jefferson IP Law, LLP

(57) ABSTRACT

A camera module is provided. The camera module includes a housing assembly, a lens assembly that is accommodated in the housing assembly and that includes at least one lens, and an aperture module that adjusts an amount of external light incident on the at least one lens. The aperture module includes an aperture base including a base opening through which the at least one lens is exposed based on being viewed from above the at least one lens, an aperture slider that is disposed on one side surface of the aperture base and that performs a sliding motion along a specified path, an aperture lever that rotates through a specified angle depending on the sliding motion of the aperture slider, and aperture blades that move toward or away from each other depending on a rotation of the aperture lever.

20 Claims, 26 Drawing Sheets

(56) References Cited

U.S. PATENT DOCUMENTS

| | | | |
|---|---|---|---|
| 2018/0343370 A1* | 11/2018 | Park | G02B 13/001 |
| 2019/0369461 A1* | 12/2019 | Sawanobori | G03B 9/14 |
| 2020/0064588 A1 | 2/2020 | Lee | |
| 2020/0249545 A1* | 8/2020 | Wang | H04N 5/2257 |

FOREIGN PATENT DOCUMENTS

| | | |
|---|---|---|
| KR | 10-2012-0124876 A | 11/2012 |
| KR | 10-2018-0065686 A | 6/2018 |
| KR | 10-2018-0127698 A | 11/2018 |

* cited by examiner

<701>

<702>

CAMERA MODULE INCLUDING APERTURE

CROSS-REFERENCE TO RELATED APPLICATIONS

This application is based on and claims priority under 35 U.S.C. § 119 of a Korean patent application number 10-2019-0126996, filed on Oct. 14, 2019, in the Korean Intellectual Property Office, the disclosure of which is incorporated by reference herein in its entirety.

BACKGROUND

1. Field

The disclosure relates to a camera module. More specifically, the disclosure relates to a camera module of an electronic device.

2. Description of Related Art

Various forms of portable electronic devices, such as a smartphone, a tablet personal computer (PC), and the like, have been widely used with the development of information technology (IT).

A camera module may be included in the electronic devices. The camera module may be made compact so as to be contained in the electronic devices and may include various functions. For example, the camera module may include a zoom function to enlarge or reduce a subject at various magnifications. In another example, the camera module may include an auto focus (AF) function.

The above information is presented as background information only to assist with an understanding of the disclosure. No determination has been made, and no assertion is made, as to whether any of the above might be applicable as prior art with regard to the disclosure.

SUMMARY

The size and thickness of a portable electronic device in the related art may be restricted in consideration of portability, and the size and thickness of a camera module contained in the portable electronic device may also be restricted. Accordingly, the camera module of the portable electronic device in the related art is manufactured by adopting a camera module that does not include some components, such as an aperture module. Alternatively, in a case where a camera module includes an aperture module, the size of an external decoration corresponding to the camera module in the portable electronic device is determined based on the size of the aperture module.

Aspects of the disclosure are to address at least the above-mentioned problems and/or disadvantages and to provide at least the advantages described below. Accordingly, an aspect of the disclosure is to provide a camera module including an aperture cover having a smaller size than the exterior of the camera module by using aperture blades that move toward or away from each other.

Additional aspects will be set forth in part in the description which follows and, in part, will be apparent from the description, or may be learned by practice of the presented embodiments.

In accordance with an aspect of the disclosure, a camera module is provided. The camera module includes a housing assembly, a lens assembly that is accommodated in the housing assembly and that includes at least one lens, and an aperture module that adjusts an amount of external light incident on the at least one lens. The aperture module includes an aperture base including a base opening through which the at least one lens is exposed based on being viewed from above the at least one lens, an aperture slider that is disposed on one side surface of the aperture base and that performs a sliding motion along a specified path, an aperture lever that rotates through a specified angle depending on the sliding motion of the aperture slider, and a plurality of aperture blades that move toward or away from each other depending on a rotation of the aperture lever, and the amount of the external light incident on the at least one lens is adjusted by a movement of the plurality of aperture blades.

In accordance with another aspect of the disclosure, a camera module is provided. The camera module includes a housing assembly, a carrier assembly that is accommodated in the housing assembly, the carrier assembly is configured to move forward and backward in a first direction, a lens assembly that is accommodated in the carrier assembly and that includes at least one lens arranged in the first direction, and an aperture module that adjusts an amount of external light incident on the at least one lens. The aperture module includes an aperture base including a base opening through which the at least one lens is exposed based on being viewed from above the at least one lens, an aperture slider that is disposed on one side surface of the aperture base and that performs a sliding motion in a second direction perpendicular to the first direction, an aperture lever that rotates through a specified angle depending on the sliding motion of the aperture slider, and a plurality of aperture blades that move toward or away from each other in a third direction depending on a rotation of the aperture lever, the third direction being perpendicular to the first direction and different from the second direction, and an amount of the external light incident on the at least one lens is adjusted by a movement of the plurality of aperture blades in the third direction.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize changes and modifications, of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

Figure 1:
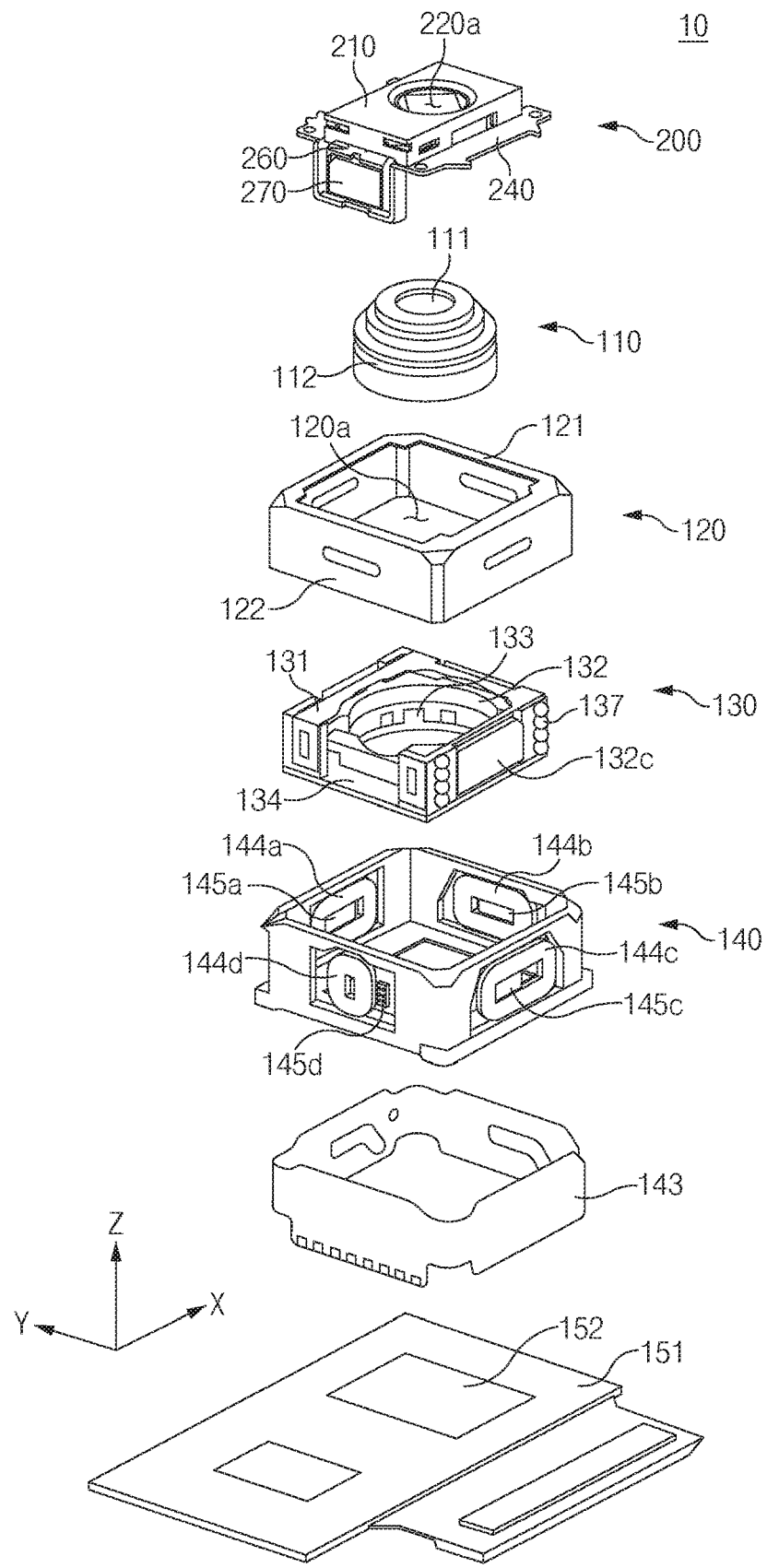
FIG. 1 is an exploded perspective view of a camera module according to an embodiment of the disclosure.
Figure 2:
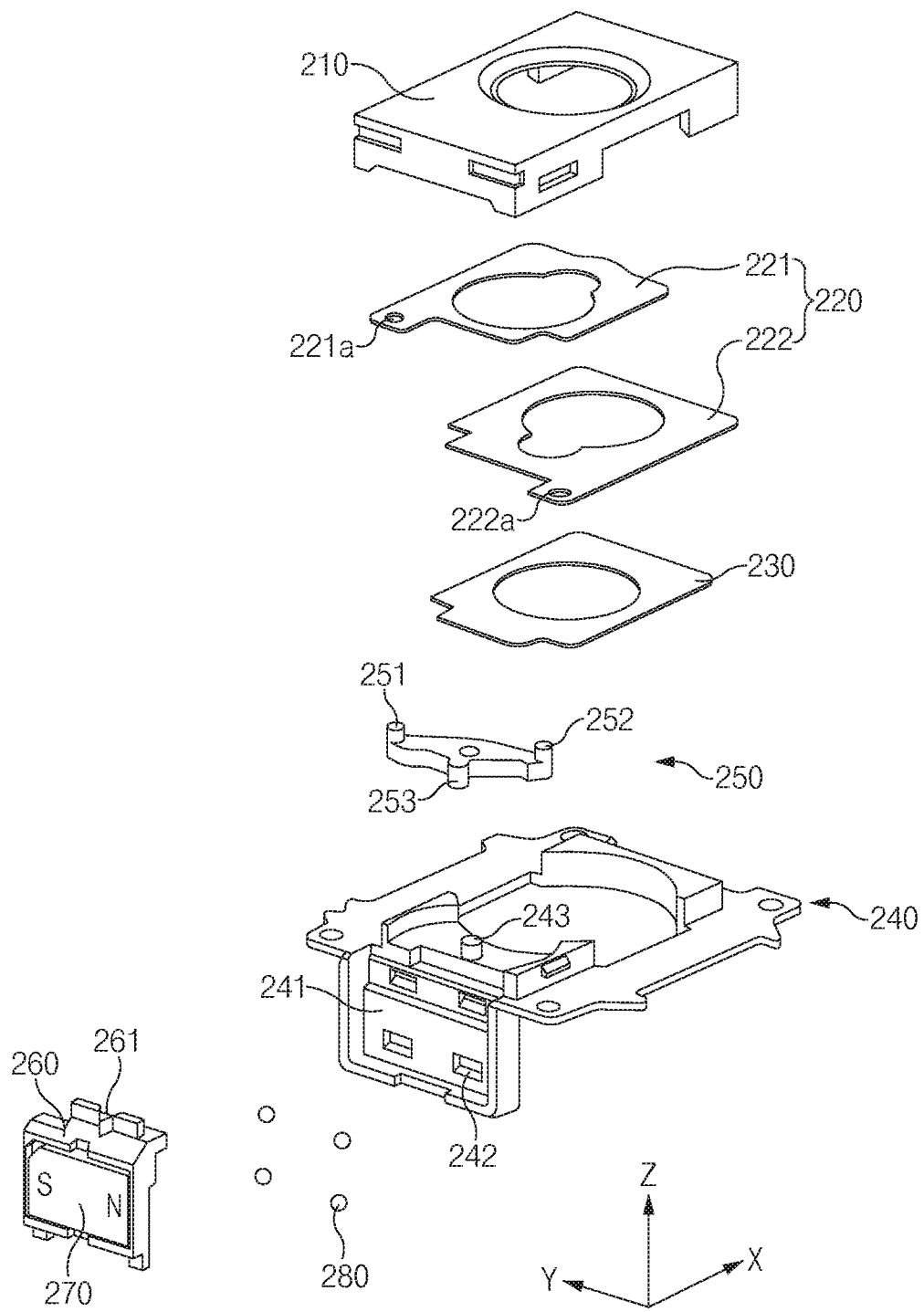
FIG. 2 is an exploded perspective view of an aperture module illustrated in FIG. 1 according to an embodiment of the disclosure.
Figure 3:
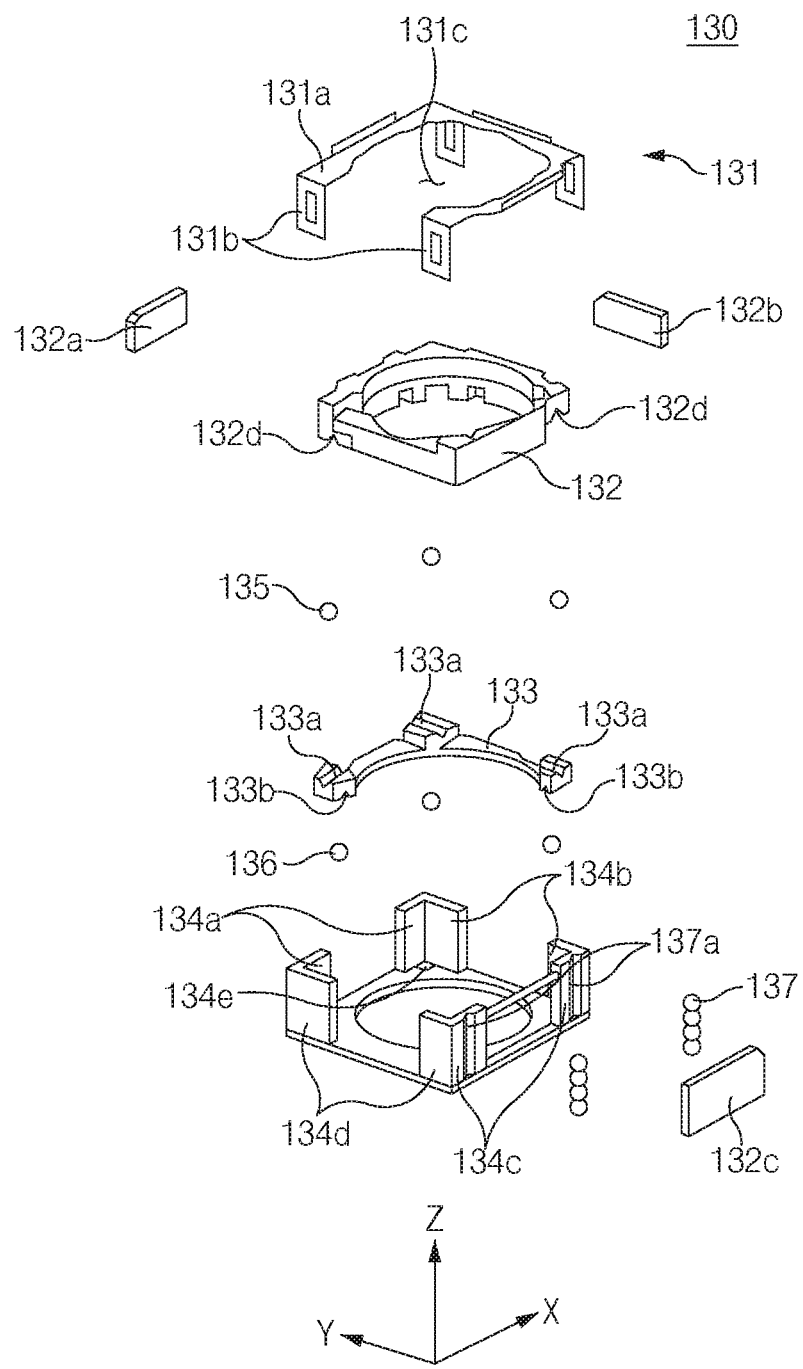
FIG. 3 is an exploded perspective view of a carrier assembly illustrated in FIG. 1 according to an embodiment of the disclosure.
Figure 4:
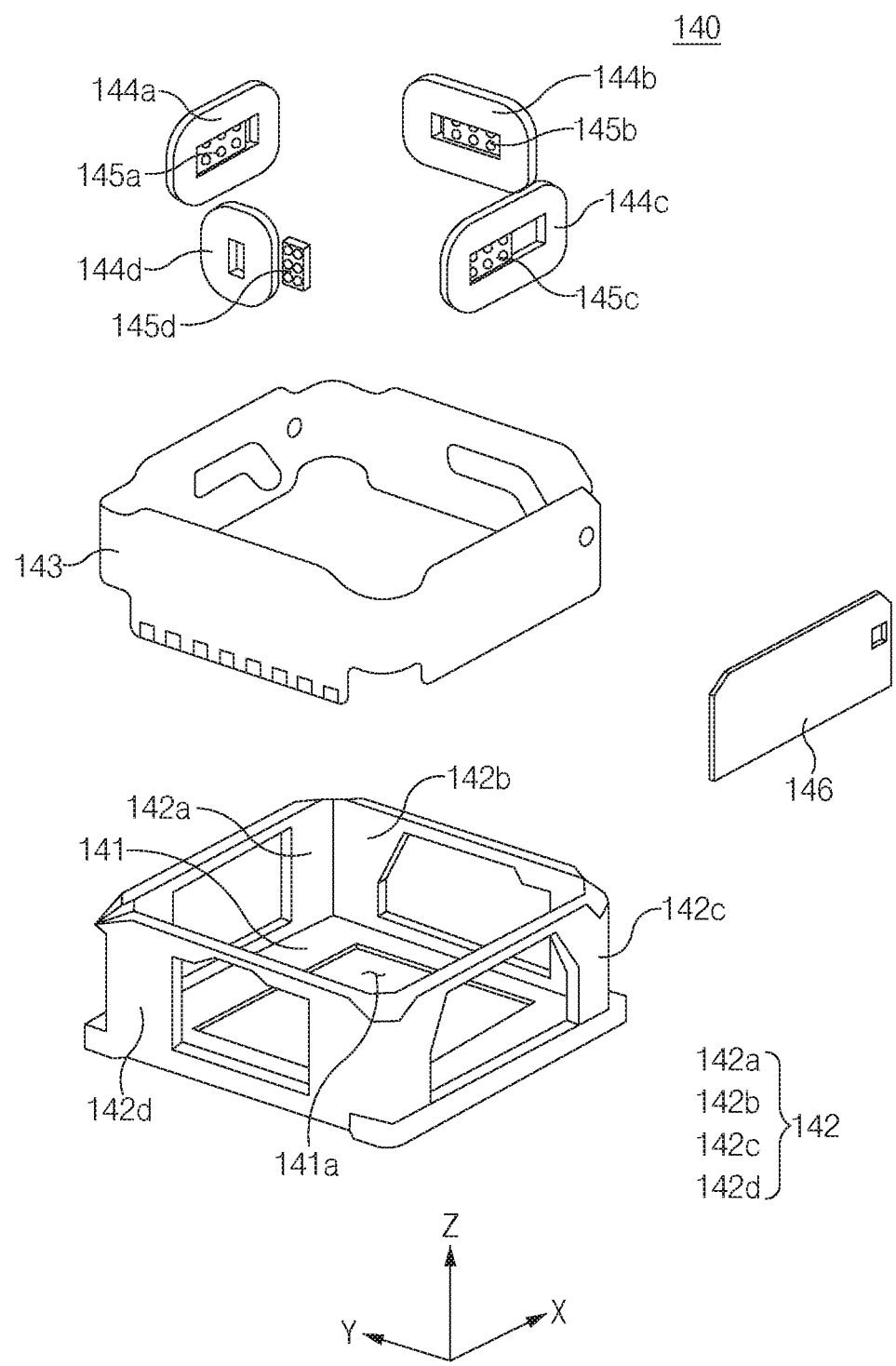
FIG. 4 is an exploded perspective view of a housing assembly illustrated in FIG. 1 according to an embodiment of the disclosure.

It is to be understood that the singular forms "a," "an," and "the" include plural referents unless the context clearly dictates otherwise. Thus, for example, reference to "a component surface" includes reference to one or more of such surfaces, FIG. 1 is an exploded perspective view of a camera module according to an embodiment of the disclosure. FIG. 2 is an exploded perspective view of an aperture module illustrated in FIG. 1 according to an embodiment of the disclosure. FIG. 3 is an exploded perspective view of a carrier assembly illustrated in FIG. 1 according to an embodiment of the disclosure. FIG. 4 is an exploded perspective view of a housing assembly illustrated in FIG. 1 according to an embodiment of the disclosure.

Referring to FIGS. 1, 2, 3 and 4, the camera module 10 may include a lens assembly 110, and a lens drive unit or an actuator structure (e.g., the carrier assembly 130 and the housing assembly 140). Alternatively, the camera module 10 may include the lens assembly 110, a shield can 120, and the actuator structure. In another case, the camera module 10 may include the aperture module 200 for adjusting the amount of light incident on a lens 111, a sensor PCB 151, and an image sensor 152. In an embodiment, the aperture module 200 may be coupled to the carrier assembly 130 and may integrally move together with the carrier assembly 130.

According to an embodiment, the aperture module 200 may include an aperture cover 210, an aperture blade unit 220, an aperture spacer 230, an aperture base 240, an aperture lever 250, and an aperture slider 260. For example, to minimize the sizes of the aperture cover 210 and the aperture blade unit 220, the aperture module 200 may include a plurality of aperture blades (e.g., a first aperture blade 221 and a second aperture blade 222) that move toward or away from each other at the time of adjustment of an aperture.

According to an embodiment, the aperture cover 210 may be disposed on the aperture base 240 and may prevent an escape of the aperture blade unit 220. For example, the aperture cover 210 may prevent the aperture blade unit 220 from escaping upward while the size (or, the opening ratio) of an opening 220a of the aperture blade unit 220 is changed. Furthermore, the aperture cover 210 may guide rectilinear movement of the blades (e.g., the first aperture blade 221 and the second aperture blade 222) of the aperture blade unit 220.

According to an embodiment, the aperture blade unit 220 may include the plurality of blades, and at least one blade may be moved by rotation of the aperture lever 250 to adjust the size of the opening 220a. For example, the aperture blade unit 220 may include two blades (e.g., the first aperture blade 221 and the second aperture blade 222). The first aperture blade 221 and the second aperture blade 222 may rectilinearly move in the X-axis direction, based on the rotation of the aperture lever 250. The first aperture blade 221 and the second aperture blade 222 may move toward or away from each other, and the size of the opening 220a may be adjusted linearly or in a stepwise manner depending on the movement of the first aperture blade 221 and the second aperture blade 222.

According to an embodiment, the aperture spacer 230 may be disposed between the aperture blade unit 220 and the aperture base 240. The aperture spacer 230 may reduce friction between the blades of the aperture blade unit 220 and the aperture base 240, and the first aperture blade 221 and the second aperture blade 222 may perform smooth operation.

According to an embodiment, the aperture blade unit 220, the aperture lever 250, and the aperture slider 260 may be seated on the aperture base 240. For example, the aperture base 240 may include a lever holder 243. A central portion of the aperture lever 250 may be fixed to the lever holder 243, and the aperture lever 250 may rotate about the lever holder 243.

According to an embodiment, the first aperture blade 221 and the second aperture blade 222 may be connected with the aperture lever 250. For example, the aperture lever 250 may include a first protrusion 251 and a second protrusion 252 on opposite end portions of the aperture lever 250 with respect to the central portion thereof (or, the axis of rotation). The first protrusion 251 may be connected to a first slot 221a formed in the first aperture blade 221. The second protrusion 252 may be connected to a second slot 222a formed in the second aperture blade 222. When the aperture lever 250 rotates, the first protrusion 251 and the second protrusion 252 may symmetrically rotate about the axis of rotation. The first aperture blade 221 and the second aperture blade 222, which are connected to the first protrusion 251 and the second protrusion 252, respectively, may move toward or away from each other, based on the rotation of the first protrusion 251 and the second protrusion 252.

According to an embodiment, the aperture lever 250 may rotate based on rectilinear movement of the aperture slider 260. For example, the aperture lever 250 may include a third protrusion 253 on one side of the axis of rotation thereof. The third protrusion 253 may be connected to a lever recess 261 formed on the aperture slider 260. The rectilinear movement of the aperture slider 260 may be converted to rotation of the aperture lever 250 by the connection of the third protrusion 253 and the lever recess 261, Alternatively, forward and backward movement of the aperture slider 260 in the Y-axis direction may be converted to forward and backward movement of the first aperture blade 221 and the second aperture blade 222 in the X-axis direction through the connection of the aperture slider 260 and the aperture lever 250 and the connection of the aperture lever 250 and the aperture blade unit 220. For example, when the aperture slider 260 repeatedly moves a specified distance forward and backward, the aperture lever 250 may repeatedly rotate through a specified angle. Furthermore, when the aperture lever 250 repeatedly rotates through the specified angle, the first aperture blade 221 and the second aperture blade 222 may move toward or away from each other to adjust the size of the opening 220a.

According to an embodiment, the aperture slider 260 may rectilinearly move in the Y-axis direction on one side of the aperture base 240. For example, the aperture base 240 may include, on the one side thereof, a slide rail 241 to which the aperture slider 260 is coupled. The aperture slider 260 may rectilinearly move along the slide rail 241. At least one slide ball 280 may be disposed between the slide rail 241 and the aperture slider 260. When the aperture slider 260 moves forward and backward, the slide ball 280 may perform rolling motion between the slide rail 241 and the aperture slider 260. At least one guide groove 242 in which the slide ball 280 is accommodated may be formed on side surfaces of the slide rail 241 and the aperture slider 260 that face each other. For example, the guide groove 242 may extend along a specified direction (e.g., the Y-axis direction) and may have a V-shaped cross-section. The guide groove 242 may restrict the aperture slider 260 from moving in a direction other than the specified direction (e.g., the Y-axis direction).

According to an embodiment, the lens assembly 110 may include the lens 111 and a lens barrel 112. For example, the lens 111 may collect light incident from the outside and may deliver the collected light to the image sensor 152 disposed under the lens barrel 112. The lens 111 may be constituted by one or more lens. The lens 111 may be fixed to one side of the lens barrel 112. The lens barrel 112 may surround the lens 111 mounted therein and may provide an optical path along which the light incident through the lens 111 is delivered to the image sensor 152. In this regard, the lens barrel 112 may have an empty space in the center and may be open at the bottom such that the image sensor 152 is exposed. An upper side of the lens barrel 112 may be formed in a shape corresponding to the shape of the lens 111. The lens barrel 112 may be mounted in and fixed to the carrier assembly 130. Accordingly, as the carrier assembly 130 moves, the lens assembly 110 (or, the lens barrel 112 and the lens 111) may be moved.

According to an embodiment, the shield can 120 may be provided in a form that covers the camera module 10 (or, the housing assembly 140) from above. For example, the shield can 120 may include an upper surface 121 and shield-can sidewalls 122 disposed at the periphery of the upper surface 121 and may be open at the bottom. The shield can 120 may have, in the upper surface 121 thereof, a shield-can hole 120a of a predetermined size through which at least part of the lens 111 is exposed. Furthermore, the shield-can hole 120a may be formed to be larger than the aperture module 200. The shield-can sidewalls 122 may be fastened with the periphery of the housing assembly 140 (or, the housing) of the camera module 10 and may serve to protect or fix components (e.g., the aperture module 200, the lens assembly 110, the carrier assembly 130, and the housing assembly 140) that are mounted in the shield can 120. The shield can 120 may be formed of, for example, a metallic material or a material (e.g., a metallic material or reinforced plastic) having a specified hardness or more.

According to an embodiment, the carrier assembly 130 may include a first carrier 132 (e.g., an optical image stabilizer (OIS) carrier) and a second carrier 134 (e.g., an auto focusing (AF carrier). For example, the first carrier 132 may have an empty space inside, in which the lens barrel 112 is disposed. The aperture module 200 may be seated on and fixed to an upper portion of the first carrier 132. The first carrier 132 may include a first magnet member 132a and a second magnet member 132b (e.g., magnet members for optical image stabilization) disposed on at least two outer portions thereof. For example, the at least two outer portions may include lateral portions that share an edge.

According to an embodiment, the first magnet member 132a and the second magnet member 132b for optical image stabilization (e.g., an optical image stabilizer (OIS)) may be paired with optical-image-stabilization-related coils disposed on the second carrier 134 (e.g., coils 144a and 144b disposed on sides of the housing assembly 140). For example, the first magnet member 132a and the second magnet member 132b may be used to move the first carrier 132, to which the lens barrel 112 is fixed, in the X-axis and Y-axis directions (or, in the directions of two horizontal axes when the upper direction in which the shield can 120 is disposed is defined as a vertical axis).

According to an embodiment, the carrier assembly 130 may include a cover 131 (or, an OIS cover). For example, the cover 131 may be provided in a form that covers the carrier assembly 130 from above. The cover 131 may prevent an escape of the first carrier 132 from the second carrier 134. In this regard, the cover 131 may include an upper base plate 131a and leads 131b. The upper base plate 131a may have a circular or polygonal (e.g., quadrangular) strap shape with an empty space in the center and may include, in the center thereof, a cover hole 131c of a predetermined size through which the opening 220a of the aperture module 200 and at least part of the lens 111 are exposed. In various embodiments, one side surface of the upper base plate 131a may be removed such that the slide rail 241 of the aperture module 200 is disposed. The aperture module 200 may be coupled to the top side of the upper base plate 131a. Each of the leads 131b may extend from one side (e.g., a corner area) of the upper base plate 131a in the vertically downward direction and may have a predetermined length and width. In an embodiment, the lead 131b may have a ring shape with an empty space in the center and may be coupled to one side of the second carrier 134.

According to an embodiment, the first carrier 132 may be mounted in the central portion of the second carrier 134. For example, the first carrier 132 may be moved in the second carrier 134 in the X-axis or Y-axis direction. The second carrier 134 may include one or more carrier sidewalls. For example, the second carrier 134 may include a first carrier sidewall 134a formed to expose the first magnet member 132a that operates to move the first carrier 132, in which the lens barrel 112 is mounted, in the X-axis direction and a second carrier sidewall 134b formed to expose the second magnet member 132b that operates to move the first carrier 132, in which the lens barrel 112 is mounted, in the Y-axis direction. Furthermore, the second carrier 134 may include a third carrier sidewall 134c, and a third magnet member 132c used to move the lens assembly 110 in the Z-axis direction may be disposed on the outer side of the third carrier sidewall 134c. In addition, the second carrier 134 may include a fourth carrier sidewall 134d formed such that the aperture slider 260 and an aperture magnet member 270 on one side of the aperture module 200 are exposed to the outside.

According to an embodiment, the carrier assembly 130 may include a guide member 133 and guide balls 135 and 136 that guide and support movement of the first carrier 132. For example, the first guide balls 135 may be disposed between the first carrier 132 and the guide member 133. The first carrier 132 may move forward and backward in the X-axis direction (or, the Y-axis direction) through the first guide balls 135. The second guide balls 136 may be disposed between the guide member 133 and the second carrier 134. The guide member 133 may move forward and backward in the Y-axis direction (or, the X-axis direction) through the second guide balls 136. Accordingly, the first carrier 132 may move forward and backward in the Y-axis direction (or, the X-axis direction). The first carrier 132, the guide member 133, and the second carrier 134 may include guide grooves 132d, 133a, 133b, and 134e in which the guide balls 135 and 136 are accommodated. For example, the guide grooves 132d, 133a, 133b, and 134e may extend along a specified direction (e.g., the X-axis or Y-axis direction) and may have a V-shaped cross-section. The guide grooves 132d, 133a, 133b, and 134e may restrict the first carrier 132 from moving in a direction other than the specified direction (e.g., the X-axis or Y-axis direction). When the first carrier 132 moves forward and backward in the X-axis or Y-axis direction, the guide balls 135 and 136 may perform rolling motion in the guide grooves 132d, 133a, 133b, and 134e.

According to an embodiment, the second carrier 134 may include, on at least one sidewall (e.g., the third carrier sidewall 134c), AF guide grooves 137a and AF guide balls 137 that guide and support movement of the second carrier 134. For example, the AF guide grooves 137a may restrict the second carrier 134 from moving in a direction other than a specified direction (e.g., the Z-axis direction) in the housing assembly 140. The AF guide grooves 137a may extend along the specified direction (e.g., the Z-axis direction) and may have a V-shaped cross-section. When the second carrier 134 moves forward and backward in the Z-axis direction, the AF guide balls 137 may perform rolling motion in the AF guide grooves 137a.

According to an embodiment, the housing assembly 140 may include a seating part 141 on which the above-described components (e.g., the aperture module 200, the lens assembly 110, and the carrier assembly 130) are seated and housing sidewalls 142 disposed to surround the above-described components. The seating part 141 may include, in the center thereof, a seating part hole 141a through which the central portion of the lens assembly 110 is exposed in the lower direction. For example, the image sensor 152 may be disposed under the seating part hole 141a. The housing sidewalls 142 may be disposed at the periphery of the seating part 141 while sharing an edge. The housing sidewalls 142 may include, for example, a first housing sidewall 142a, a second housing sidewall 142b, a third housing sidewall 142c, and a fourth housing sidewall 142d. The first coil 144a that operates in conjunction with the first magnet member 132a on the first carrier 132 such that the lens assembly 110 is moved in the X-axis direction is disposed in the first housing sidewall 142a. The second coil 144b that operates in conjunction with the second magnet member 132b on the first carrier 132 such that the lens assembly 110 is moved in the Y-axis direction is disposed in the second housing sidewall 142b. The third coil 144c that operates in conjunction with the third magnet member 132c disposed such that the lens assembly 110 is moved in the Z-axis direction is disposed in the third housing sidewall 142c. An aperture coil 144d that operates in conjunction with the aperture magnet member 270 is disposed in the fourth housing sidewall 142d.

According to an embodiment, an AF yoke 146 may be disposed on a side surface of the third housing sidewall 142c in which the third coil 144c is disposed. For example, the third coil 144c may be disposed between the third magnet member 132c and the AF yoke 146. The AF yoke 146 may concentrate an electromagnetic force between the third magnet member 132c and the third coil 144c, thereby improving the efficiency of the third coil 144c. Furthermore, the second carrier 134 may be brought into close contact with the third housing sidewall 142c by the attraction force between the third magnet member 132c and the AF yoke 146. Accordingly, the AF guide balls 137 may not deviate from the AF guide grooves 137a, and the second carrier 134 may smoothly move forward and backward in the Z-axis direction.

According to an embodiment, the housing sidewalls 142a, 142b, 142c, and 142d may be fastened with the shield-can sidewalls 122 and may protect the above-described camera-module-related components therein. For example, the housing assembly 140 may include first to third Hall sensors 145a, 145b, and 145c and at least one aperture Hall sensor 145d. The first Hall sensor 145a may collect sensor information depending on X-axis movement of the first carrier 132. The second Hall sensor 145b may collect sensor information depending on Y-axis movement of the first carrier 132. The third Hall sensor 145c may collect sensor information depending on Z-axis movement of the lens assembly 110. The aperture Hall sensor 145d may collect sensor information depending on Y-axis movement of the aperture slider 260. The first to third Hall sensors 145a, 145b, and 145c and the aperture Hall sensor 145d may be electrically connected to a printed circuit board 143 (e.g., a flexible printed circuit board (FPCB)) and may transfer the collected sensor information to a first processor (e.g., control circuitry) of the camera module 10 or a second processor of an electronic device through the printed circuit board 143. For example, the first processor may be mounted on the sensor PCB 151.

According to an embodiment, the printed circuit board 143 may supply signals (e.g., electric currents) to the coils 144a, 144b, 144c, and 144d disposed in the housing assembly 140. For example, the printed circuit board 143 may be connected to the first processor (or, the control circuitry) associated with driving the camera module 10 or the second processor of the electronic device in which the camera module 10 is mounted. Under the control of at least one of the first processor and the second processor, the printed circuit board 143 may supply signals of specified magnitudes (e.g., electric currents of specified magnitudes) to the coils 144a, 144b, 144c, and 144d included in the housing assembly 140. According to various embodiments, the printed circuit board 143 may receive sensing values from the Hall sensors 145a, 145b, 145c, and 145d disposed in the housing assembly 140 and may supply signals corresponding to the sensing values to the coils 144a, 144b, 144c, and 144d.

According to an embodiment, the camera module 10 may include the image sensor 152 (e.g., a memory element) that collects an image. For example, the image sensor 152. may be disposed to face toward the lens 111 through the seating part hole 141a located in the bottom of the housing assembly 140. The image sensor 152 may be disposed on the sensor PCB 151.

Figure 5A:
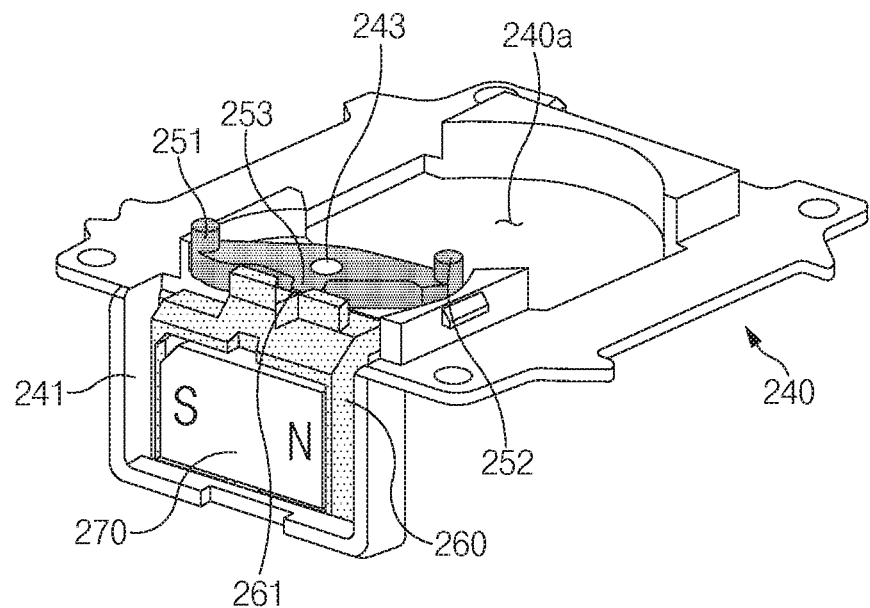
FIG. 5A is a view illustrating an aperture base, an aperture lever, and an aperture slider of the camera module according to an embodiment of the disclosure.
Figure 5B:
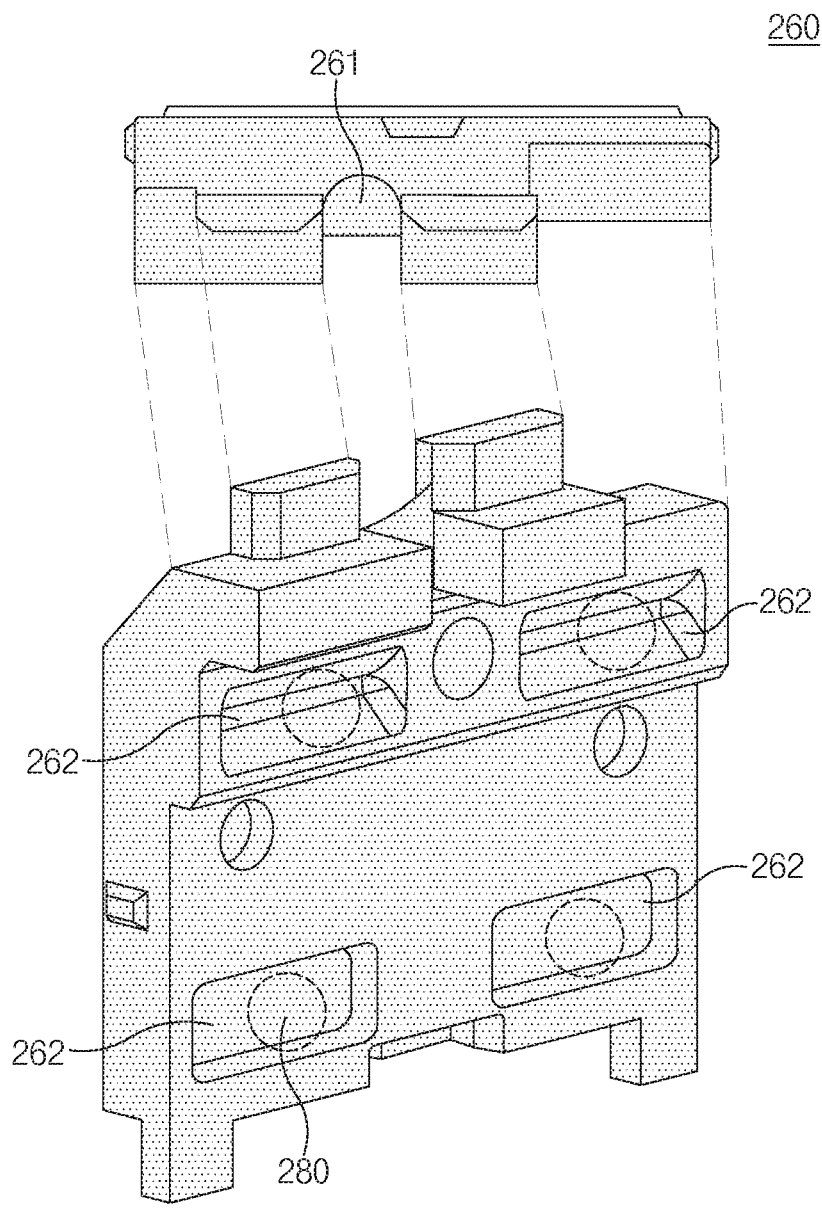
FIG. 5B is a view illustrating one surface of the aperture slider moving along a slide rail of the aperture base according to an embodiment of the disclosure.
Figure 6A:
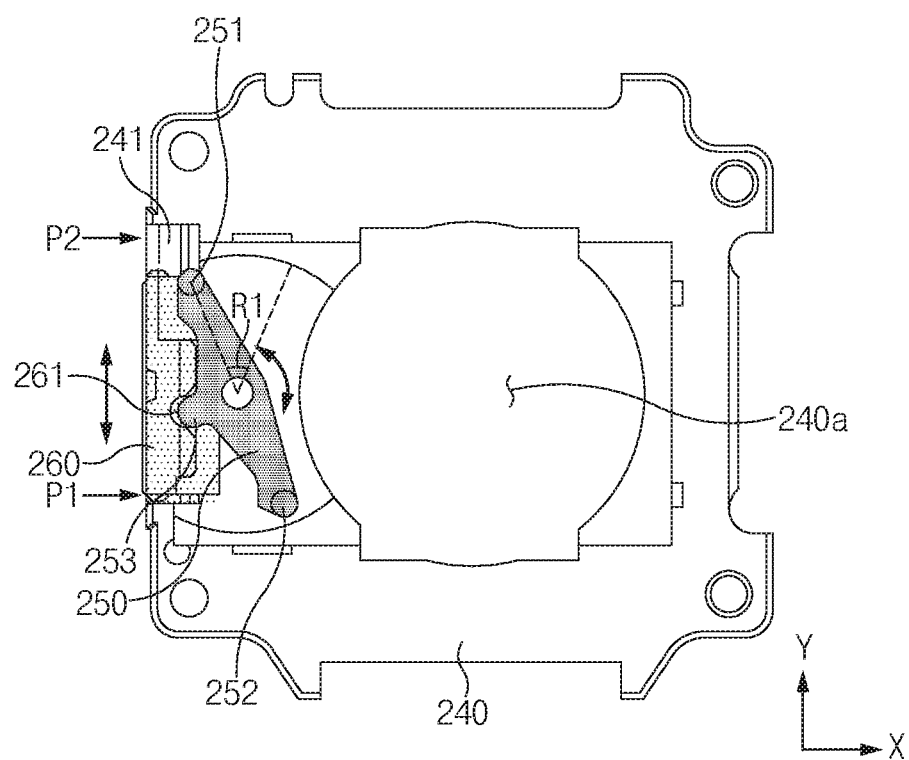
FIG. 6A is a plan view illustrating a first lever state of the aperture slider and the aperture lever of the camera module according to an embodiment of the disclosure.
Figure 6B:
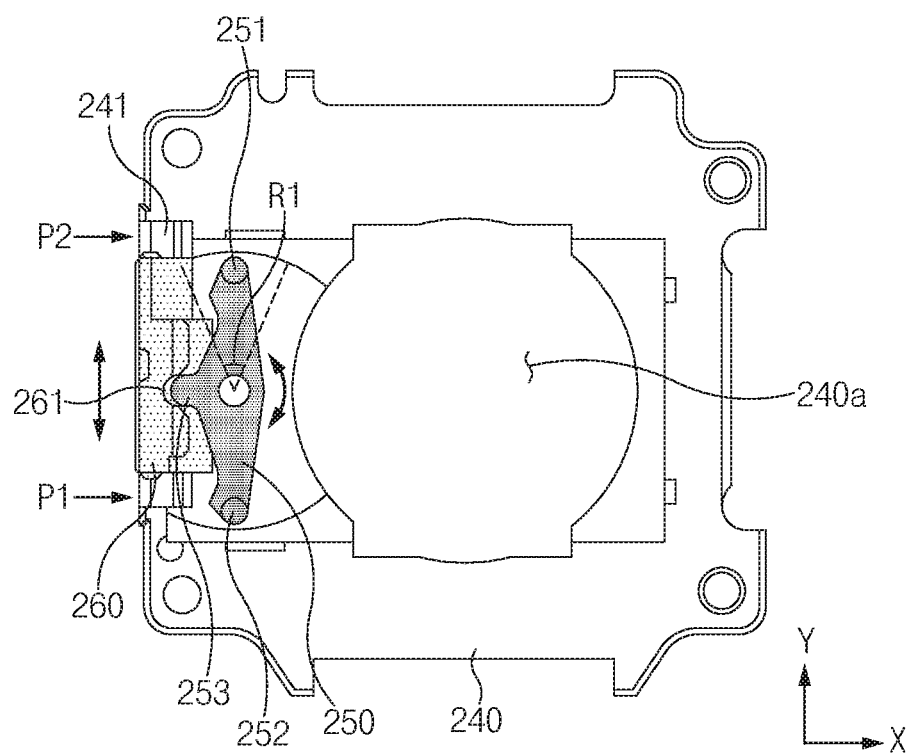
FIG. 6B is a plan view illustrating a second lever state of the aperture slider and the aperture lever of the camera module according to an embodiment of the disclosure.
Figure 6C:
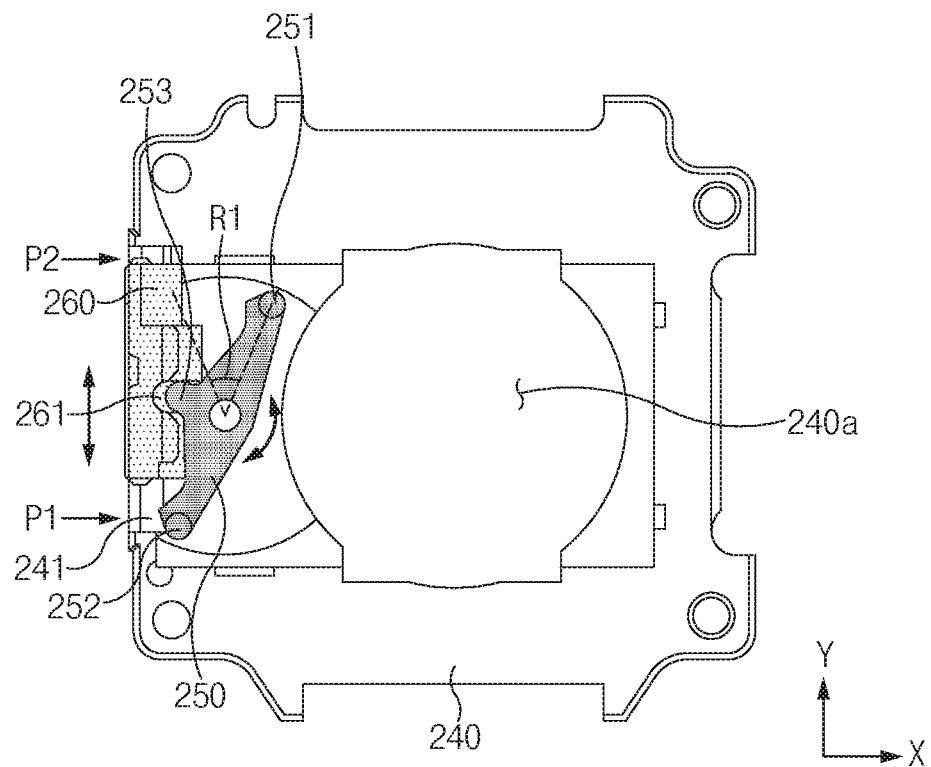
FIG. 6C is a plan view illustrating a third lever state of the aperture slider and the aperture lever of the camera module according to an embodiment of the disclosure.

FIG. 5A is a view illustrating the aperture base, the aperture lever, and the aperture slider of the camera module according to an embodiment of the disclosure. FIG. 5B is a view illustrating one surface of the aperture slider moving along the slide rail of the aperture base according to an embodiment of the disclosure. FIG. 6A is a plan view illustrating a first lever state of the aperture slider and the aperture lever of the camera. module according to an embodiment of the disclosure. Referring to FIG. 6B, is a second lever state of the aperture slider and the aperture lever of the camera module according to an embodiment of the disclosure. FIG. 6C is a plan view illustrating a third lever state of the aperture slider and the aperture lever of the camera module according to an embodiment of the disclosure.

Referring to FIGS. 5A, 5B, 6A, 6B and 6C, an aperture module (e.g., the aperture module 200) of a camera module (e.g., the camera module 10) may include the aperture base 240, the aperture lever 250, and the aperture slider 260. For example, the aperture lever 250 and the aperture slider 260 may be seated on the aperture base 240. For example, the aperture base 240 may include the lever holder 243. The lever holder 243 may be formed on an upper portion of the aperture base 240. The lever holder 243 may be located between an aperture opening 240a and the slide rail 241. The central portion of the aperture lever 250 may be fixed to the lever holder 243, and the aperture lever 250 may rotate about the lever holder 243. The slide rail 241, to which the aperture slider 260 is coupled, may be provided on the one side of the aperture base 240 on which the aperture lever 250 is disposed. The aperture slider 260 may perform sliding motion (e.g., reciprocating motion, advance and retreat motion, or reciprocal rotary motion) along a specified path (e.g., between a first position P1 and a second position P2) on the slide rail 241.

According to an embodiment, the at least one slide ball 280 may be disposed between the slide rail 241 and the aperture slider 260. For example, the guide grooves 242 and 262 in which the slide ball 280 is accommodated may be formed on the side surfaces of the slide rail 241 and the aperture slider 260 that face each other. For example, the guide grooves 242 and 262 may extend along a specified direction (e.g., the Y-axis direction) and may have a V-shaped cross-section. The guide grooves 242 and 262 may restrict the aperture slider 260 from moving in a direction other than the specified direction (e.g., the Y-axis direction), When the aperture slider 260 moves forward and backward, the slide ball 280 may perform rolling motion between the slide rail 241 and the aperture slider 260.

According to an embodiment, the aperture lever 250 may perform rotary motion as the aperture slider 260 moves forward and backward. For example, the aperture lever 250 may include the third protrusion 253 on one side of the axis of rotation thereof. The third protrusion 253 may be connected to the lever recess 261 formed on the aperture slider 260. When the aperture slider 260 moves forward and backward, the third protrusion 253 may integrally move together with the aperture slider 260. The aperture lever 250 may rotate about the lever holder 243 when the third protrusion 253 integrally moves forward and backward together with the aperture slider 260 in a state in which the central portion of the aperture lever 250 is fixed to the lever holder 243. The aperture lever 250 may include opposite arms extending from the central portion thereof in opposite directions. The aperture lever 250 may include the first protrusion 251 and the second protrusion 252 that protrude from ends of the opposite arms in the direction of the axis of rotation (e.g., the Z-axis direction). The first protrusion 251 and the second protrusion 252 may rotate about the axis of rotation by a specified angle (e.g., an angle of R1), based on the forward and backward movement of the aperture slider 260.

According to an embodiment, the first protrusion 251 may be connected to a first slot (e.g., the first slot 221a) formed in a first aperture blade (e.g., the first aperture blade 221). The second protrusion 252 may be connected to a second slot (e.g., the second slot 222a) formed in a second aperture blade (e.g., the second aperture blade 222). For example, the first aperture blade may move forward and backward depending on rotation of the first protrusion 251. The second aperture blade may move forward and backward depending on rotation of the second protrusion 252. For example, on the aperture lever 250, the first protrusion 251 and the second protrusion 252 may be formed at the same distance from the axis of rotation (e.g., the lever holder 243). Alternatively, the first protrusion 251 and the second protrusion 252 may be disposed to be symmetric to each other with respect to a straight line that connects the center of the axis of rotation and the third protrusion 253. Accordingly, the first aperture blade and the second aperture blade may move toward or away from each other. The size of an opening of the aperture module (e.g., the aperture module 200) may be adjusted by the movement of the first aperture blade and the second aperture blade.

According to an embodiment, the aperture lever 250 may have the first lever state, the second lever state, or the third lever state. For example, in the first lever state illustrated in FIG. 6A, the aperture slider 260 may move toward the first position P1, the first protrusion 251 of the aperture lever 250 may rotate to approach the aperture slider 260, and the second protrusion 252 of the aperture lever 250 may rotate to move away from the aperture slider 260. In the second lever state illustrated in FIG. 6B, the aperture slider 260 may move between the first position P1 and the second position P2, and the aperture lever 250 may rotate about the axis of rotation within a specified angle (e.g., the angle of R1). The second lever state may include both a state in which the aperture slider 260 moves from the first position P1 to the second position P2 and a state in which the aperture slider 260 moves from the second position P2 to the first position P1. In various embodiments, in the second lever state, the aperture slider 260 may stop at a specific point between the first position P1 and the second position P2. In the third lever state illustrated in FIG. 6C, the aperture slider 260 may move toward the second position P2, the second protrusion 252 of the aperture lever 250 may rotate to approach the aperture slider 260, and the first protrusion 251 of the aperture lever 250 may rotate to move away from the aperture slider 260.

Figure 7A:
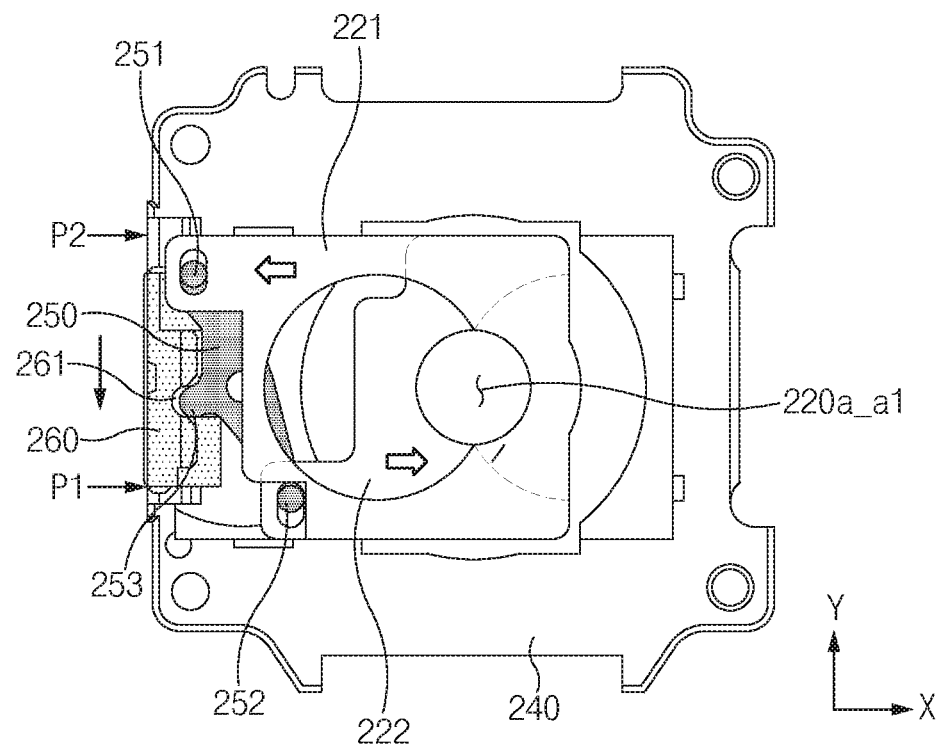
FIG. 7A is a view illustrating a first aperture state of an aperture module used in a camera module of a first type according to an embodiment of the disclosure.
Figure 7B:
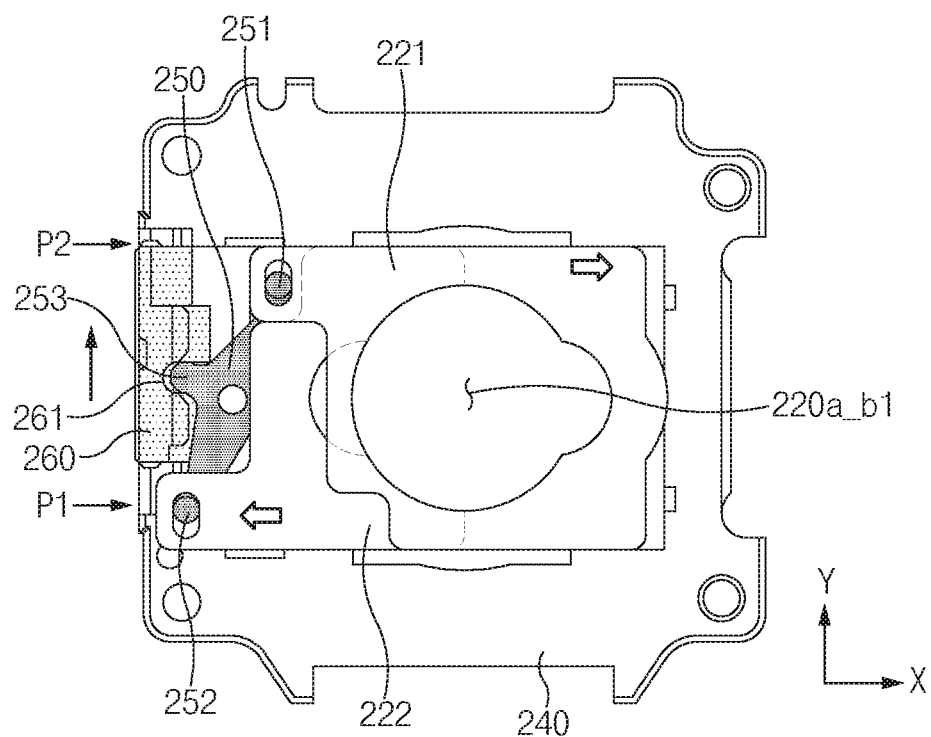
FIG. 7B is a view illustrating a second aperture state of the aperture module used in the camera module of the first type according to an embodiment of the disclosure.
Figure 7C:
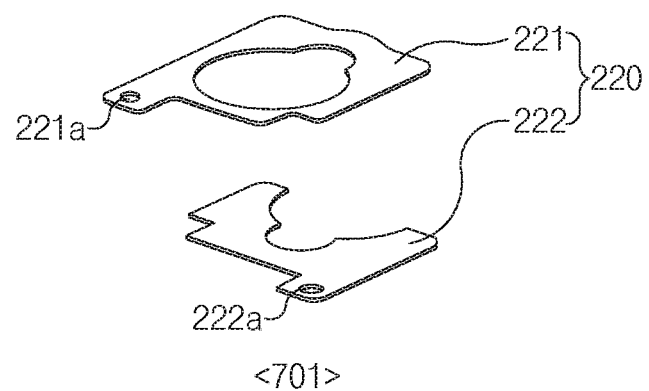
FIG. 7C is a view illustrating examples of an aperture blade used in the camera module of the first type according to an embodiment of the disclosure.
Figure 7C:
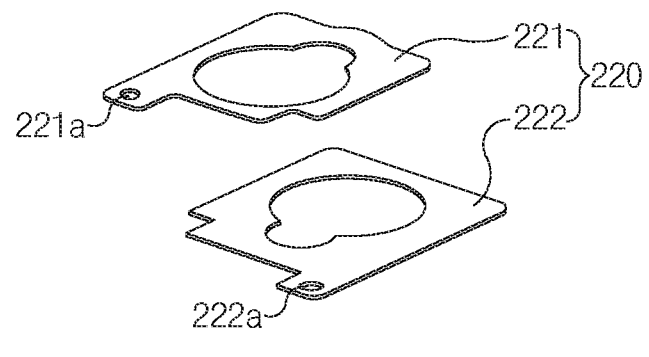

FIG. 7A is a view illustrating a first aperture state of an aperture module used in a camera module of a first type according to an embodiment of the disclosure. FIG. 7B is a view illustrating a second aperture state of the aperture module used in the camera module of the first type according to an embodiment of the disclosure. FIG. 7C is a view illustrating examples of an aperture blade used in the camera module of the first type according to an embodiment of the disclosure.

Referring to FIGS. 7A and 7B, in the first aperture state (e.g., the first lever state illustrated in FIG. 6A), the aperture slider 260 may stop at the first position P1. In the second aperture state (e.g., the third lever state illustrated in FIG. 6C), the aperture slider 260 may stop at the second position P2. For example, the aperture slider 260 may be changed from the first aperture state to the second aperture state or from the second aperture state to the first aperture state. The aperture slider 260 may move forward and backward between the first position P1 and the second position P2 (e.g., the second lever state illustrated in FIG. 6B). The camera module of the first type illustrated in FIGS. 7A and 7B may have the first aperture state and the second aperture state in which the size of the aperture opening is discontinuously changed.

According to an embodiment, the aperture slider 260 may stop in one of the first aperture state or the second aperture state. For example, in the first aperture state, the aperture slider 260 may move to the first position P1, the first protrusion 251 of the aperture lever 250 may rotate to approach the aperture slider 260, and the second protrusion 252 of the aperture lever 250 may rotate to move away from the aperture slider 260. At this time, the first aperture blade 221 may rectilinearly move toward the aperture slider 260, and the second aperture blade 222 may rectilinearly move away from the aperture slider 260. In the second aperture state, the aperture slider 260 may move to the second position P2, the first protrusion 251 may rotate to move away from the aperture slider 260, and the second protrusion 252 may rotate to approach the aperture slider 260. At this time, the first aperture blade 221 may rectilinearly move away from the aperture slider 260, and the second aperture blade 222 may rectilinearly move toward the aperture slider 260.

According to an embodiment, in the first aperture state, a first aperture opening 220a_a1 may be adjusted to have a first area. Alternatively, the perimeter (or, the length of a side) of the first aperture opening 220a_a1 may be adjusted to a first length. In the second aperture state, a second aperture opening 220a_b1 may be adjusted to have a second area. Alternatively, the perimeter (or, the length of a side) of the second aperture opening 220a_b1 may be adjusted to a second length. The second area (or, the second length) may be set to be greater than the first area (or, the first length).

Referring to FIG. 7C, the first aperture blade 221 and the second aperture blade 222 may have various shapes. For example, in 701, the first aperture blade 221 may include an opening that has part of a circle with a first radius and part of a circle with a second radius smaller than the first radius. The second aperture blade 222 may have a size (e.g., one half of the first aperture blade 221) that is smaller than the size of the first aperture blade 221. The second aperture blade 222 may include an opening that has part of the circle with the first radius and part of the circle with the second radius. In the first aperture blade 221, the part of the circle with the second radius may be formed on the opposite side to the first slot 221a with respect to the part of the circle with the first radius. In the second aperture blade 222, the part of the circle with the second radius may be formed on the same side as the second slot 222a with respect to the part of the circle with the first radius. The first aperture opening 220a_a1 or the second aperture opening 220a_b1 may be formed by a combination of the opening of the first aperture blade 221 and the opening of the second aperture blade 222.

In 702, the first aperture blade 221 may include an opening that has part of the circle with the first radius and part of the circle with the second radius. The second aperture blade 222 may have a size that is the same as, or similar to, the size of the first aperture blade 221. The second aperture blade 222 may include an opening that has part of the circle with the first radius and part of the circle with the second radius. In the first aperture blade 221, the part of the circle with the second radius may be formed on the opposite side to the first slot 221a with respect to the part of the circle with the first radius. In the second aperture blade 222, the part of the circle with the second radius may be formed on the same side as the second slot 222a with respect to the part of the circle with the first radius. The first aperture opening 220a_a1 or the second aperture opening 220a_b1 may be formed by a combination of the opening of the first aperture blade 221 and the opening of the second aperture blade 222.

According to various embodiments, the length of at least one side of the first aperture blade 221 and the second aperture blade 222 may be limited based on the size of the slide rail 241 (e.g., the length of the slide rail 241 in the Y-axis direction).

Figure 8A:
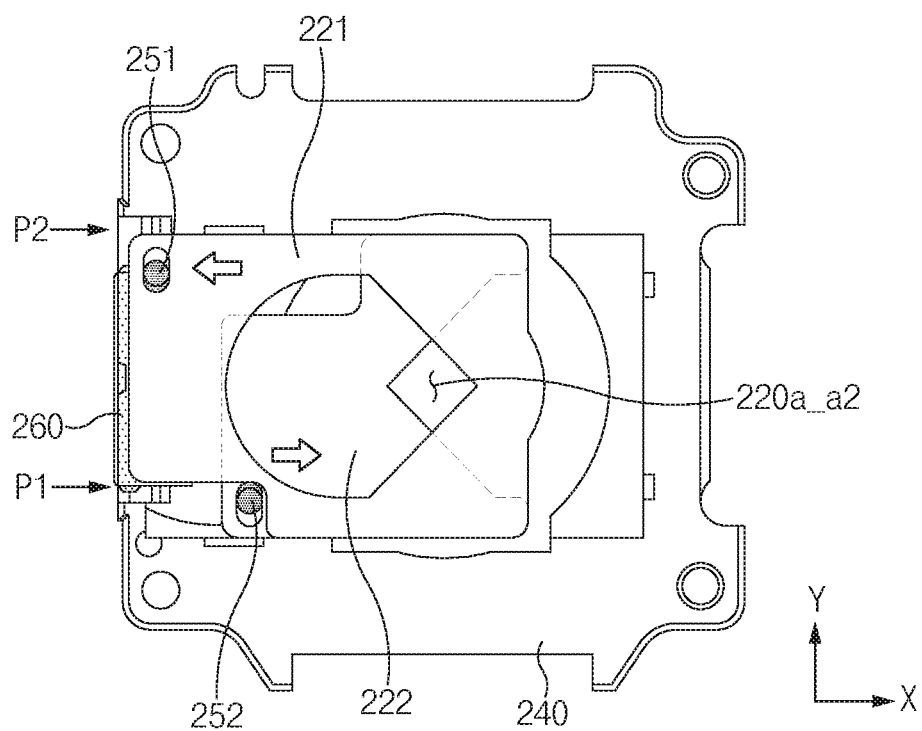
FIG. 8A is a view illustrating a first aperture state of an aperture module used in a camera module of a second type according to an embodiment of the disclosure.
Figure 8B:
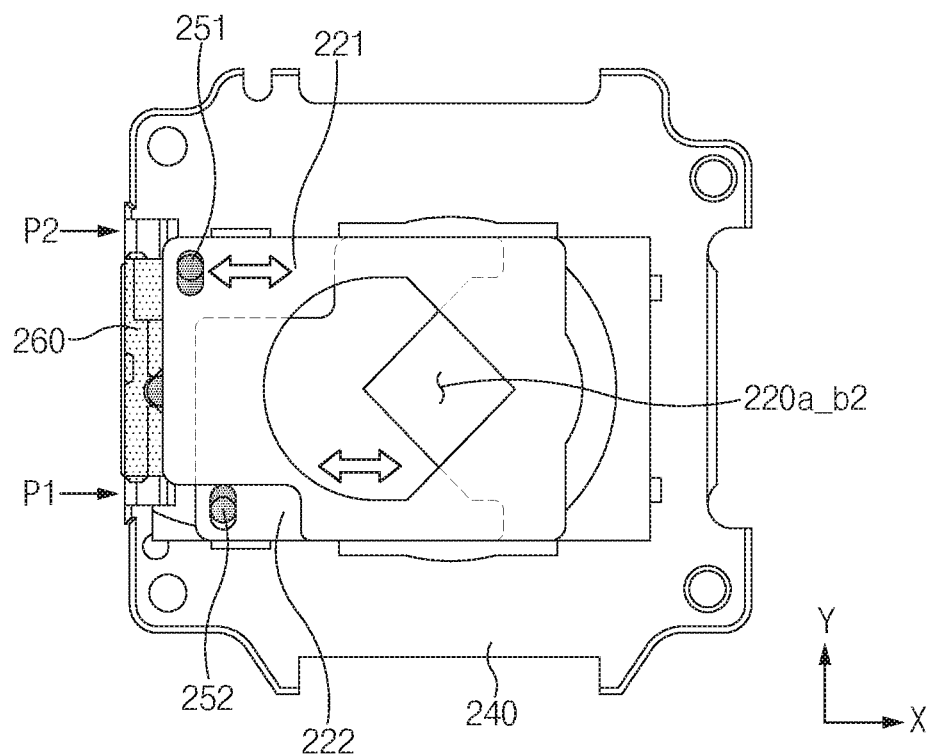
FIG. 8B is a view illustrating a second aperture state of the aperture module used in the camera module of the second type according to an embodiment of the disclosure.
Figure 8C:
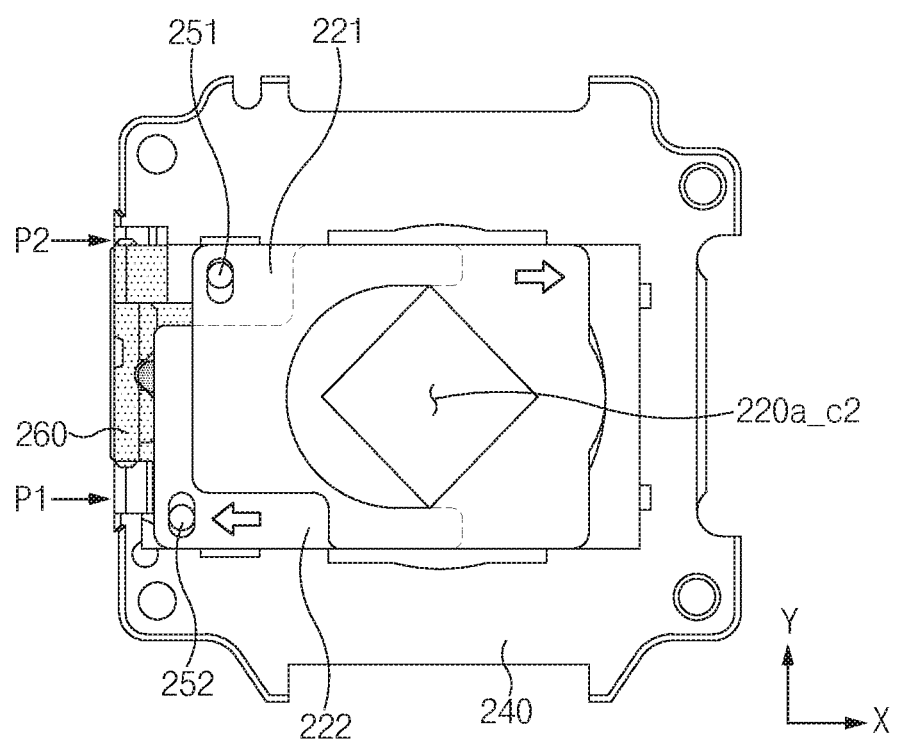
FIG. 8C is a view illustrating a third aperture state of the aperture module used in the camera module of the second type according to an embodiment of the disclosure.

FIG. 8A is a view illustrating a first aperture state of an aperture module used in a camera module of a second type according to an embodiment of the disclosure. FIG. 8B is a view illustrating a second aperture state of the aperture module used in the camera module of the second type according to an embodiment of the disclosure. FIG. 8C is a view illustrating a third aperture state of the aperture module used in the camera module of the second type according to an embodiment of the disclosure.

Referring to FIGS. 8A, 8B and 8C, in the first aperture state (e.g., the first lever state illustrated in FIG. 6A), the aperture slider 260 may stop at the first position P1. In the third aperture state (e.g., the third lever state illustrated in FIG. 6C), the aperture slider 260 may stop at the second position P2. The aperture slider 260 may move forward and backward between the first position P1 and the second position P2. In the second aperture state (e.g., the second lever state illustrated in FIG. 6B), the aperture slider 260 may stop at one point between the first position P1 and the second position P2. The camera module of the second type illustrated in FIGS. 8A, 8B and 8C may have the first aperture state, the second aperture state, and the third aperture state in which the size of the aperture opening is continuously changed.

According to an embodiment, the aperture slider 260 may stop in one of the first aperture state, the second aperture state, or the third aperture state. For example, in the first aperture state, the aperture slider 260 may move to the first position P1, the first protrusion 251 of the aperture lever 250 may rotate to approach the aperture slider 260, and the second protrusion 252 of the aperture lever 250 may rotate to move away from the aperture slider 260. At this time, the first aperture blade 221 may rectilinearly move toward the aperture slider 260, and the second aperture blade 222 may rectilinearly move away from the aperture slider 260. In the third aperture state, the aperture slider 260 may move to the second position P2, the first protrusion 251 may rotate to move away from the aperture slider 260, and the second protrusion 252 may rotate to approach the aperture slider 260. At this time, the first aperture blade 221 may rectilinearly move away from the aperture slider 260, and the second aperture blade 222 may rectilinearly move toward the aperture slider 260.

According to an embodiment, in the second aperture state, the aperture slider 260 may move to one point between the first position and the second position P2, and the first protrusion 251 and the second protrusion 252 may rotate to positions corresponding to the position of the aperture slider 260. At this time, the first aperture blade 221 and the second aperture blade 222 may rectilinearly move to positions corresponding to the position of the aperture slider 260 in opposite directions.

According to an embodiment, in the first aperture state, a first aperture opening 220a_a2 may be adjusted to have a first area. Alternatively, the perimeter (or, the length of a side) of the first aperture opening 220a_a2 may be adjusted to a first length. In the second aperture state, a second aperture opening 220a_b2 may be adjusted to have a second area. Alternatively, the perimeter (or, the length of a side) of the second aperture opening 220a_b2 may be adjusted to a second length. In the third aperture state, a third aperture opening 220a_c2 may be adjusted to have a third area. Alternatively, the perimeter (or, the length of a side) of the third aperture opening 220a_c2 may be adjusted to a third length. The second area (or, the second length) may be set to be greater than the first area (or, the first length). The third area (or, the third length) may be set to be greater than the second area (or, the second length).

According to various embodiments, while the aperture slider 260 moves forward and backward between the first position P1 and the second position P2, the perimeter (or, the length of a side) of the aperture opening (e.g., the first aperture opening 220a_a2, the second aperture opening 220a_b2, or the third aperture opening 220a_c2) formed by the first aperture blade 221 and the second aperture blade 222 may be linearly changed. Alternatively, the area of the aperture opening may be exponentially changed between the first area and the third area.

According to various embodiments, the length of at least one side of the first aperture blade 221 and the second aperture blade 222 may be limited based on the size of the slide rail 241 (e.g., the length of the slide rail 241 in the Y-axis direction).

Figure 9:
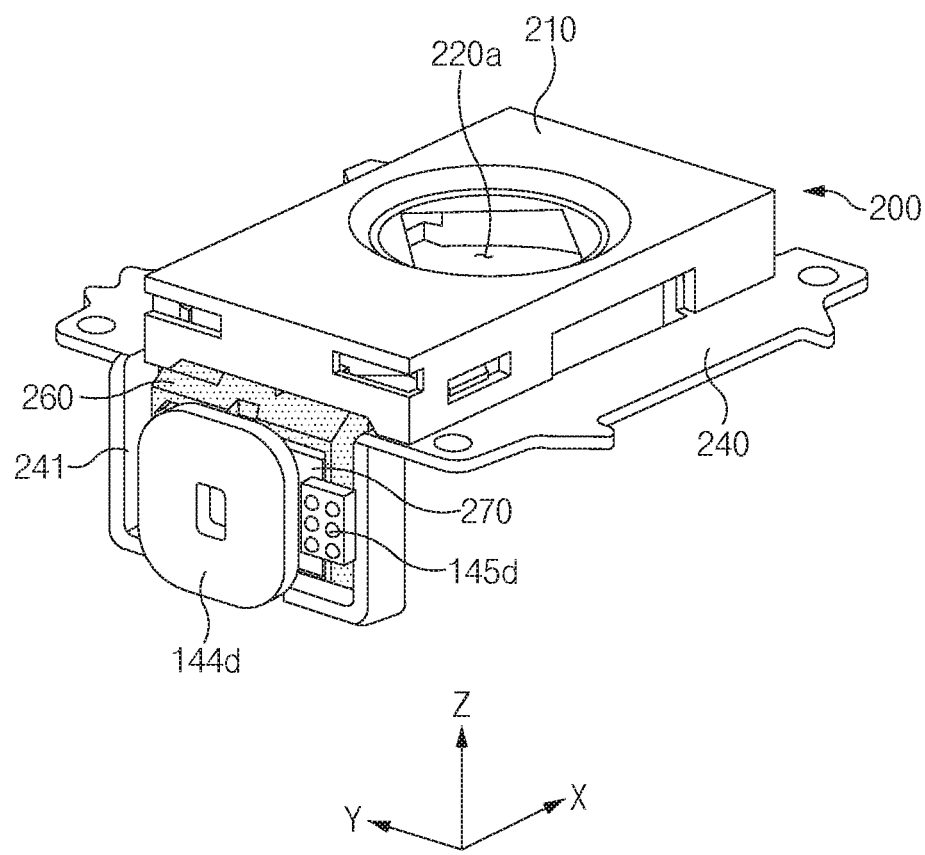
FIG. 9 is a view illustrating an aperture module, an aperture coil, and an aperture Hall sensor according to an embodiment of the disclosure.
Figure 10A:
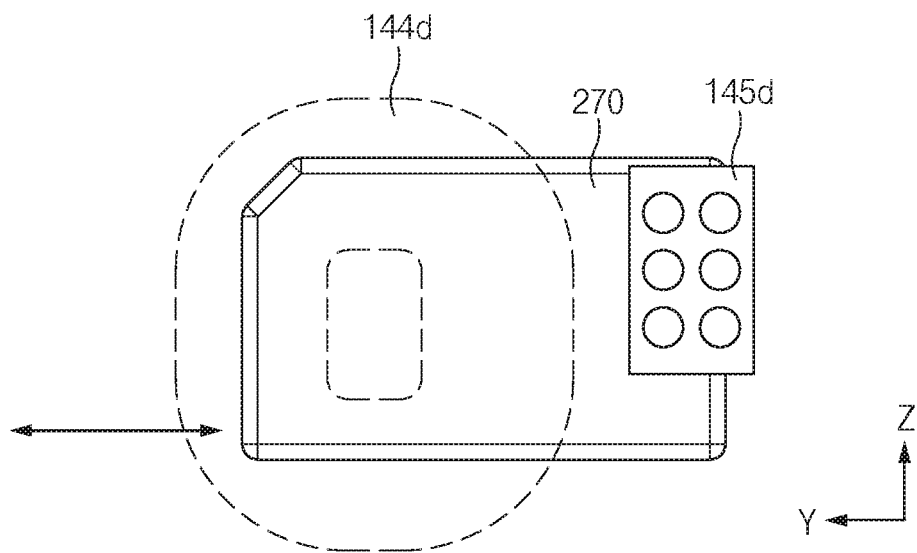
FIG. 10A is a view illustrating a first magnet state of an aperture magnet member of FIG. 9 according to various embodiments of the disclosure.
Figure 10B:
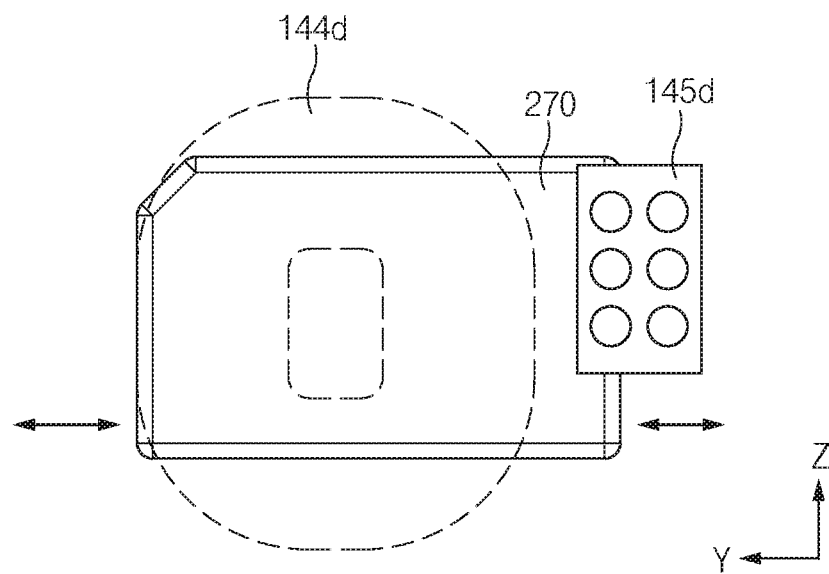
FIG. 10B is a view illustrating a second magnet state of the aperture magnet member of FIG. 9 according to an embodiment of the disclosure.
Figure 10C:
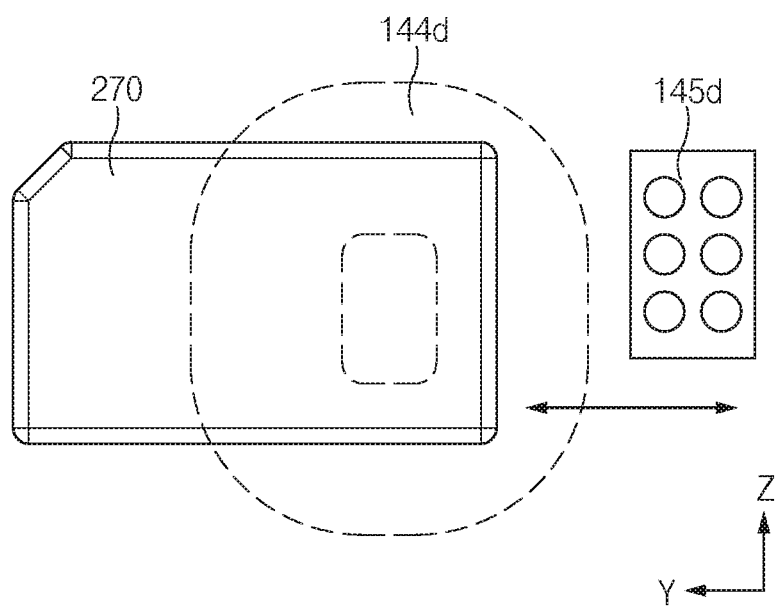
FIG. 10C is a view illustrating a third magnet state of the aperture magnet member of FIG. 9 according to an embodiment of the disclosure.

FIG. 9 is a view illustrating the aperture module, the aperture coil, and the aperture Hall sensor according to an embodiment of the disclosure. FIG. 10A is a view illustrating a first magnet state of the aperture magnet member of FIG. 9. FIG. 10B is a view illustrating a second magnet state of the aperture magnet member of FIG. 9 according to an embodiment of the disclosure. FIG. 10C is a view illustrating a third magnet state of the aperture magnet member of FIG. 9 according to an embodiment of the disclosure.

Referring to FIGS. 1, 9, and 10A, 10B and 10C, the aperture coil 144d and the aperture Hall sensor 145d may be disposed on a side surface of a housing assembly (e.g., the housing assembly 140) to face the aperture magnet member 270. The aperture magnet member 270 may be coupled to one surface of the aperture slider 260 and may integrally move forward and backward together with the aperture slider 260.

According to an embodiment, the control circuitry may input, to the aperture coil 144d, a signal corresponding to an electromagnetic force required to move the aperture magnet member 270. The aperture magnet member 270 (or, the aperture slider 260) may rectilinearly move, based on an electromagnetic force generated by the aperture coil 144d depending on the input signal. The aperture Hall sensor 145d may obtain sensing information about a magnetic force changed depending on the movement of the aperture magnet member 270. The control circuitry may determine the position of the aperture magnet member 270 (or, the aperture slider 260), based on the sensing information (e.g., the magnetic force of the aperture magnet member 270) that is obtained from the aperture Hall sensor 145d. Based on the determined position of the aperture magnet member 270 (or, the aperture slider 260), the control circuitry may generate a signal that is to be input to the aperture coil 144d (e.g., a signal regarding movement or stop of the aperture magnet member 270).

According to an embodiment, the first magnet state illustrated in FIG. 10A may correspond to the first lever state illustrated in FIG. 6A, the first aperture state illustrated in FIG. 7A, or the first aperture state illustrated in FIG. 8A. In the first magnet state, the aperture Hall sensor 145d may measure the greatest magnetic force. The third magnet state illustrated in FIG. 10C may correspond to the third lever state illustrated in FIG. 6C, the second aperture state illustrated in FIG. 7B, or the third aperture state illustrated in FIG. 8C. In the third magnet state, the aperture Hall sensor 1145d may measure the smallest magnetic force. The second magnet state illustrated in FIG. 10B may correspond to the second lever state illustrated in FIG. 6B or the second aperture state illustrated in FIG. 8B. In the second magnet state, the aperture Hall sensor 145d may measure a magnetic force that is smaller than the magnetic force in the first magnet state and is greater than the magnetic force in the third magnet state. The magnitude of the magnetic force measured by the aperture Hall sensor 145d may have a specific value depending on the position of the aperture magnet member 270 between the first magnet state and the third magnet state. Accordingly, the control circuitry may determine the position of the aperture magnet member 270, based on the magnitude of the magnetic force measured through the aperture Hall sensor 145d.

Figure 11:
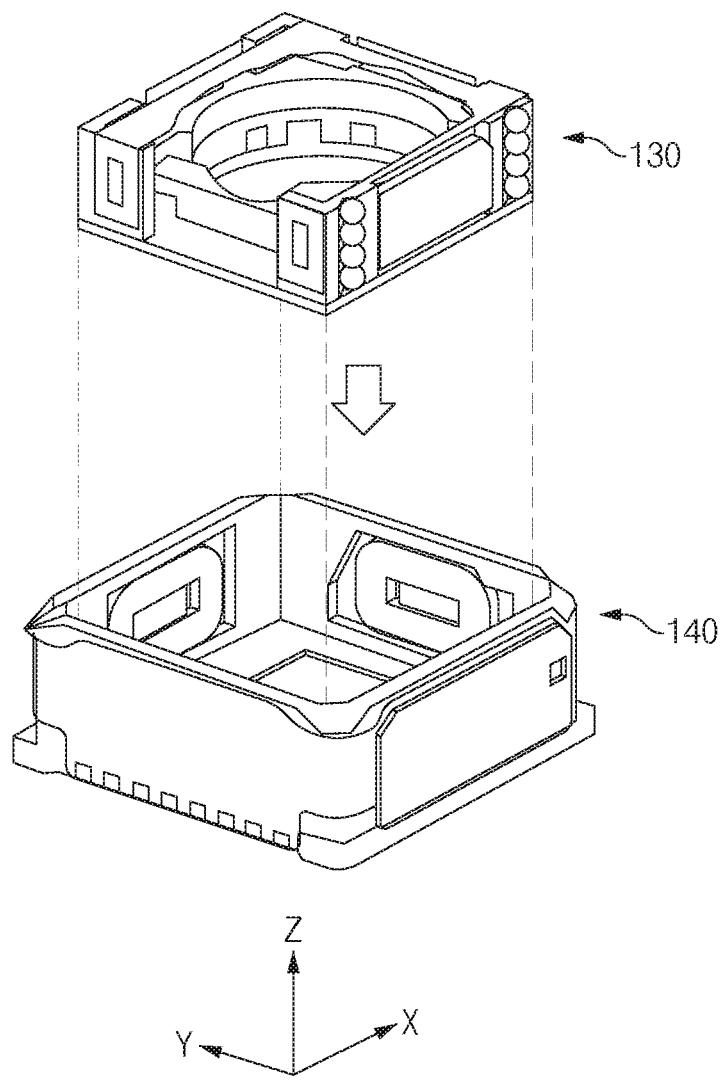
FIG. 11 is a view illustrating an arrangement structure of the carrier assembly and the housing assembly according to an embodiment of the disclosure.
Figure 12:
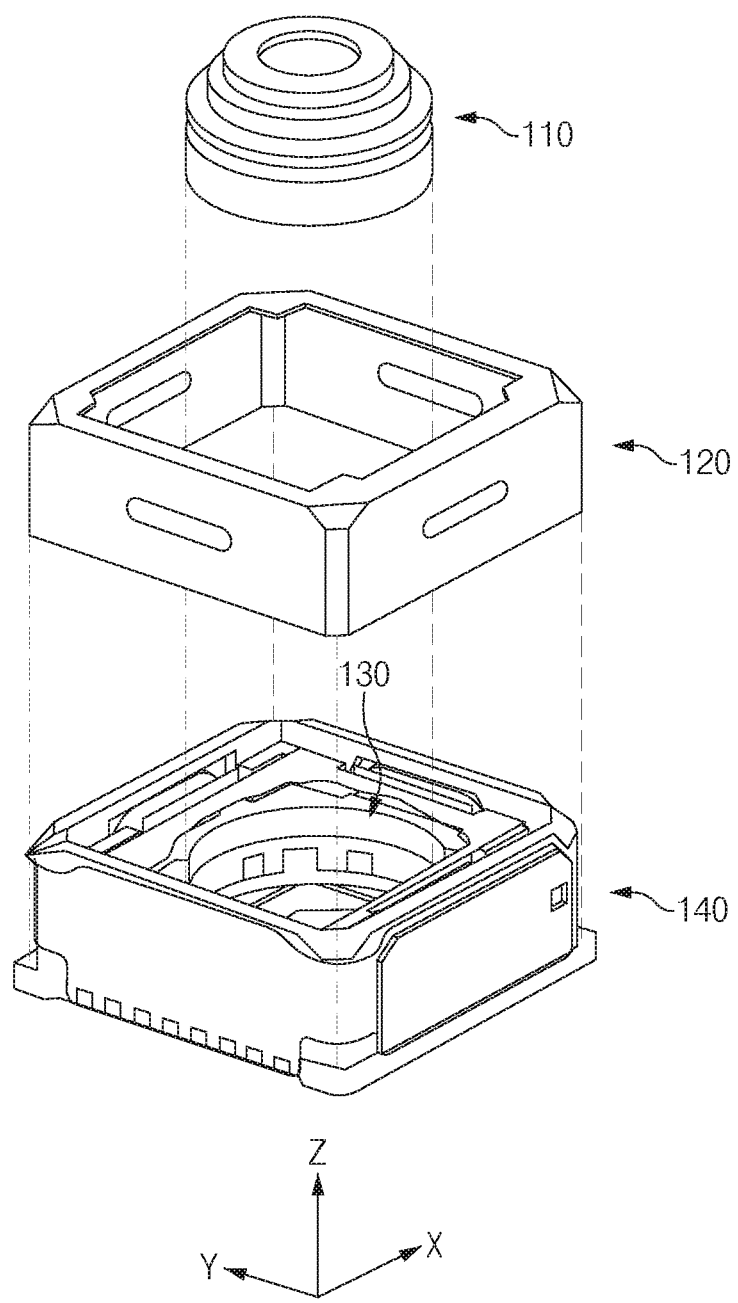
FIG. 12 is a view illustrating an arrangement structure of a lens assembly and a shield can according to an embodiment of the disclosure.
Figure 13:
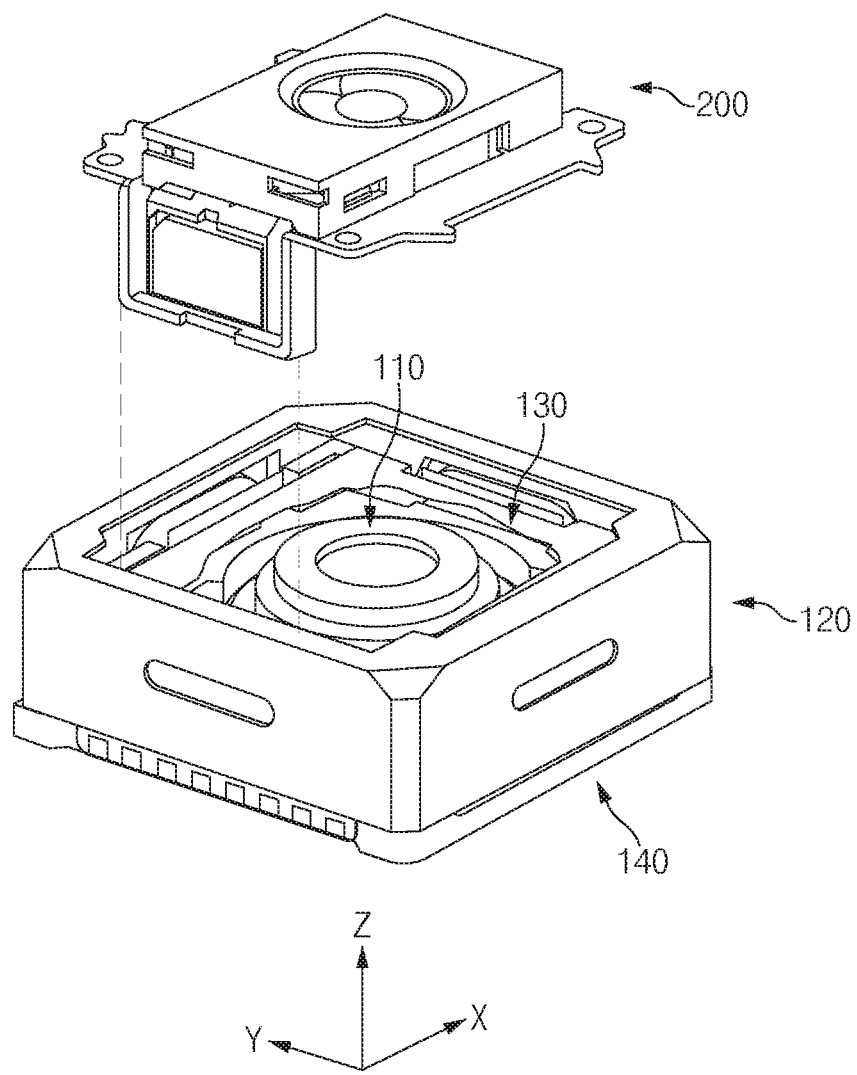
FIG. 13 is a view illustrating an arrangement structure of the aperture module according to an embodiment of the disclosure.
Figure 14:
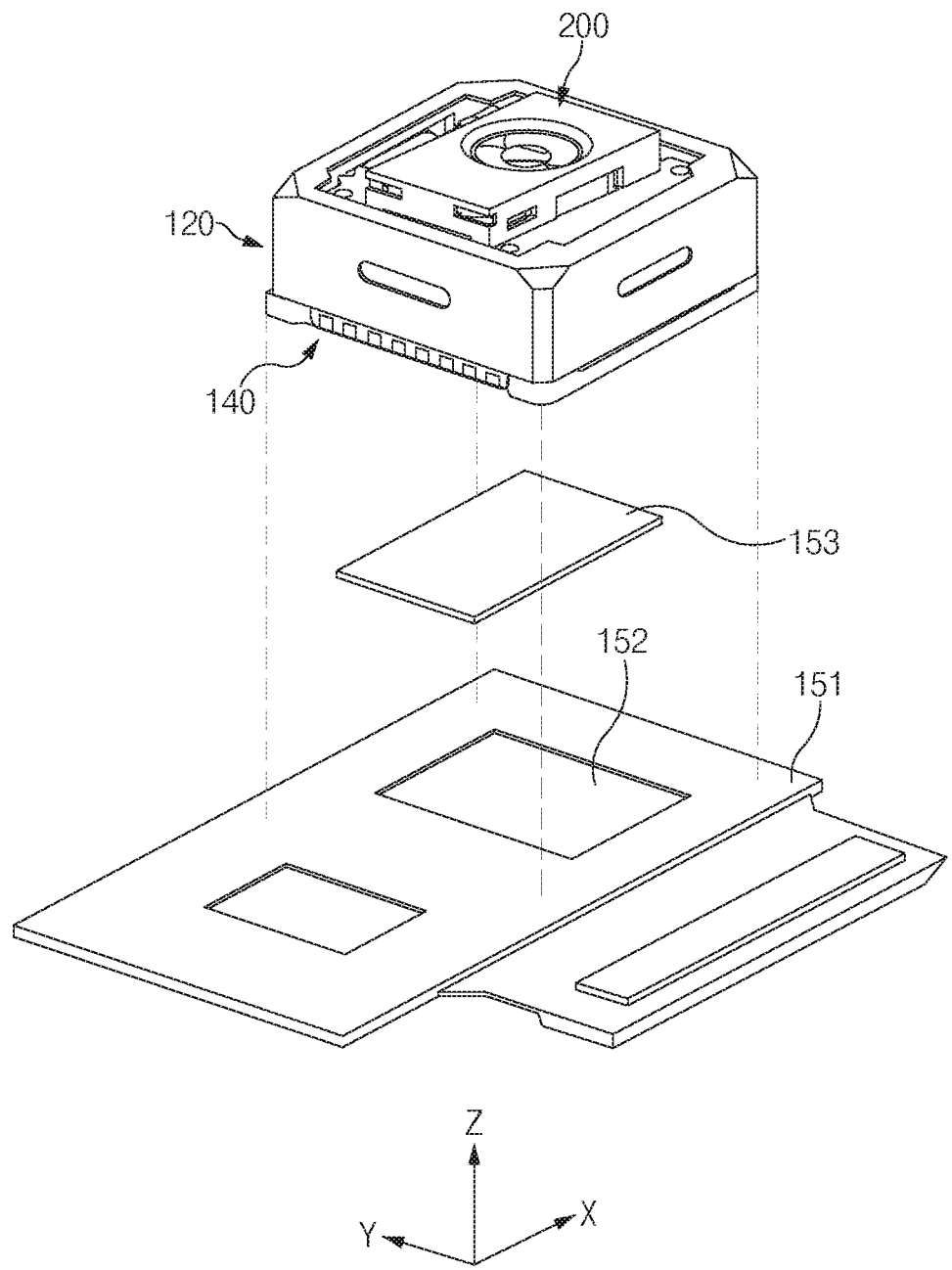
FIG. 14 is a view illustrating an arrangement structure of the camera module according to an embodiment of the disclosure.

FIG. 11 is a view illustrating an arrangement structure of the carrier assembly and the housing assembly according to an embodiment of the disclosure. FIG. 12 is a view illustrating an arrangement structure of the lens assembly and the shield can according to an embodiment of the disclosure. FIG. 13 is a view illustrating an arrangement structure of the aperture module according to an embodiment of the disclosure. FIG. 14 is a view illustrating an arrangement structure of the camera module according to an embodiment of the disclosure.

Referring to FIGS. 11, 12, 13 and 14, the housing assembly 140 may accommodate the carrier assembly 130. The carrier assembly 130 may perform advance and retreat motion (e.g., AF driving) in the Z-axis direction (e.g., an optical axis direction) in the housing assembly 140. The carrier assembly 130 may include a first carrier (e.g., the first carrier 132) and a second carrier (e.g., the second carrier 134). The first carrier may be accommodated in the second carrier. The first carrier may perform advance and retreat motion (e.g., OIS driving) in the X-axis or Y-axis direction in the second carrier. The shield can 120 may be provided in a form that covers the camera module 10 from above. For example, the shield can 120 may be provided in a form in which the top and the bottom are open. The shield can 120 may have, in an upper surface thereof, a shield-can hole (e.g., the shield-can hole 120a) of a predetermined size through which at least part of a lens (e.g., the lens 111) is exposed. The lens assembly 110 may be accommodated in the first carrier. The lens assembly 110 may include at least one lens. The aperture module 200 may be coupled to the first carrier. Accordingly, the aperture module 200 may integrally move together with the first carrier as the first carrier moves forward and backward. The housing assembly 140 may be mounted on the sensor PCB 151. The image sensor 152 may be disposed between the housing assembly 140 and the sensor PCB 151. According to various embodiments, an infrared ray (IR) filter 153 may be disposed between the housing assembly 140 and the image sensor 152.

Figure 15:
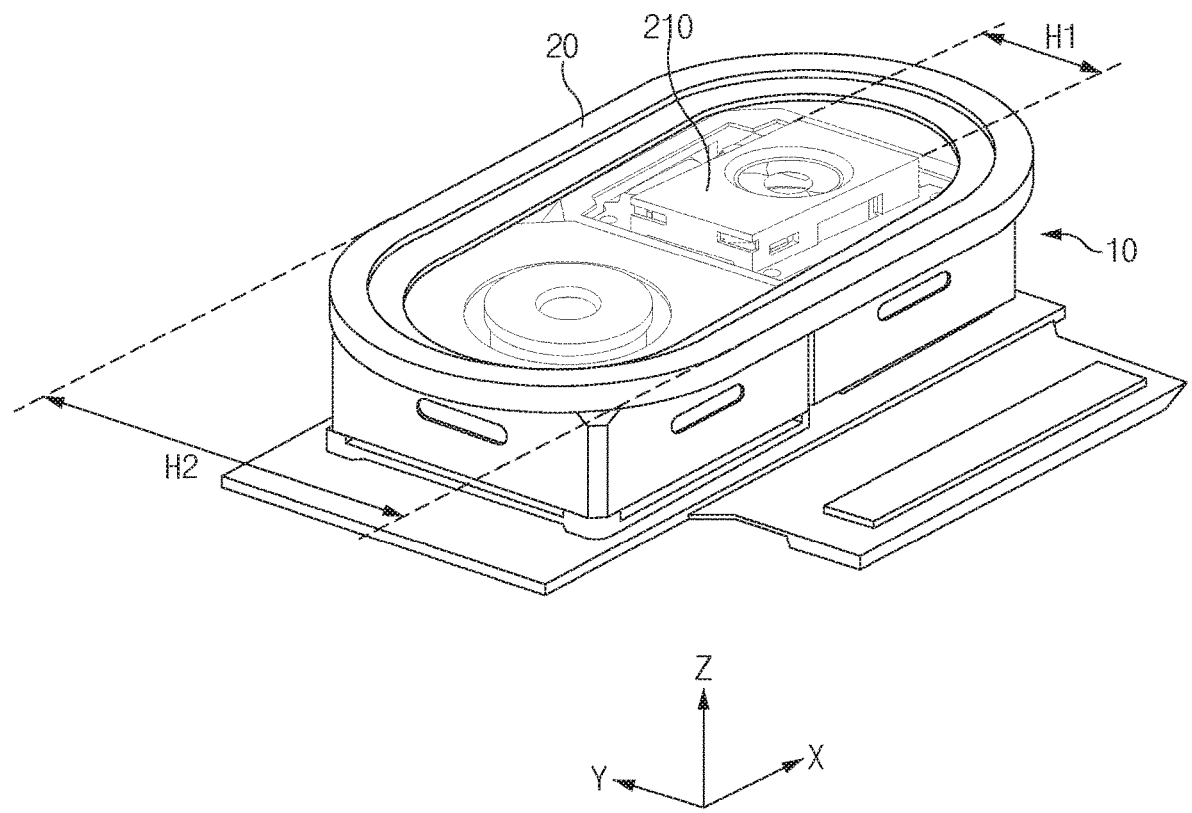
FIG. 15 is a view illustrating an arrangement structure of the camera module and an external decoration according to an embodiment of the disclosure.
Figure 16:
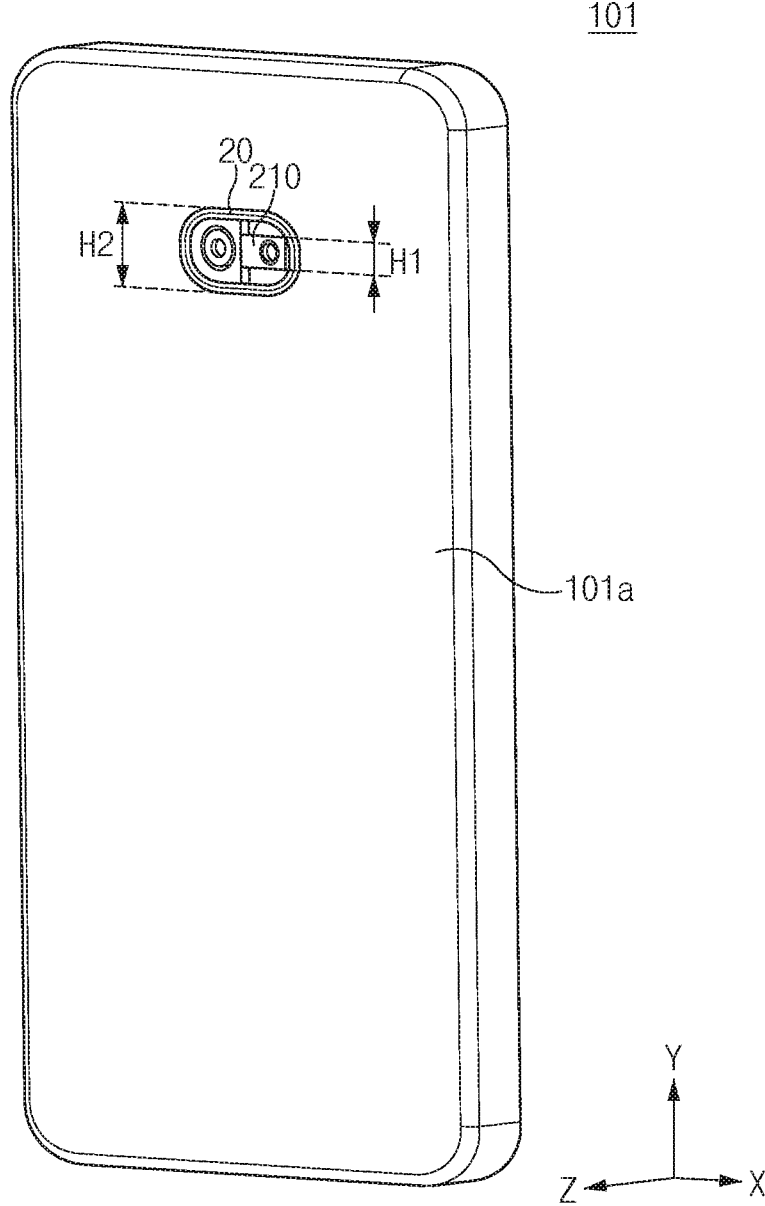
FIG. 16 is a view illustrating an arrangement state of the external decoration related to the camera module in an electronic device according to an embodiment of the disclosure.

FIG. 15 is a view illustrating an arrangement structure of the camera module and an external decoration according to an embodiment of the disclosure. FIG. 16 is a view illustrating an arrangement state of the external decoration related to the camera module in an electronic device according to an embodiment of the disclosure.

Referring to FIGS. 1, 15, and 16, the camera module 10 may be disposed on one surface 101a of the electronic device 101 (e.g., a rear surface of the electronic device 101). The external decoration 20 may be disposed on one surface of the camera module 10 (e.g., a surface facing the same direction as the one surface 101a of the electronic device 101). The aperture cover 210 of the camera module 10 may have a first length H1 in one direction (e.g., the Y-axis direction). The external decoration 20 may have a second length H2 in the one direction (e.g., the Y-axis direction). The second length H2 of the external decoration 20 may be determined depending on the first length H1 of the camera module 10. The camera module 10 of the disclosure may use a plurality of aperture blades (e.g., the first aperture blade 221 and the second aperture blade 222) that move toward or away from each other. Accordingly, the first length H1 of the aperture cover 210 may be smaller than the length of the exterior of the camera module 10 in the one direction (e.g., the Y-axis direction). Furthermore, the second length H2 of the external decoration 20 may be decreased (or minimized).

Figure 17:
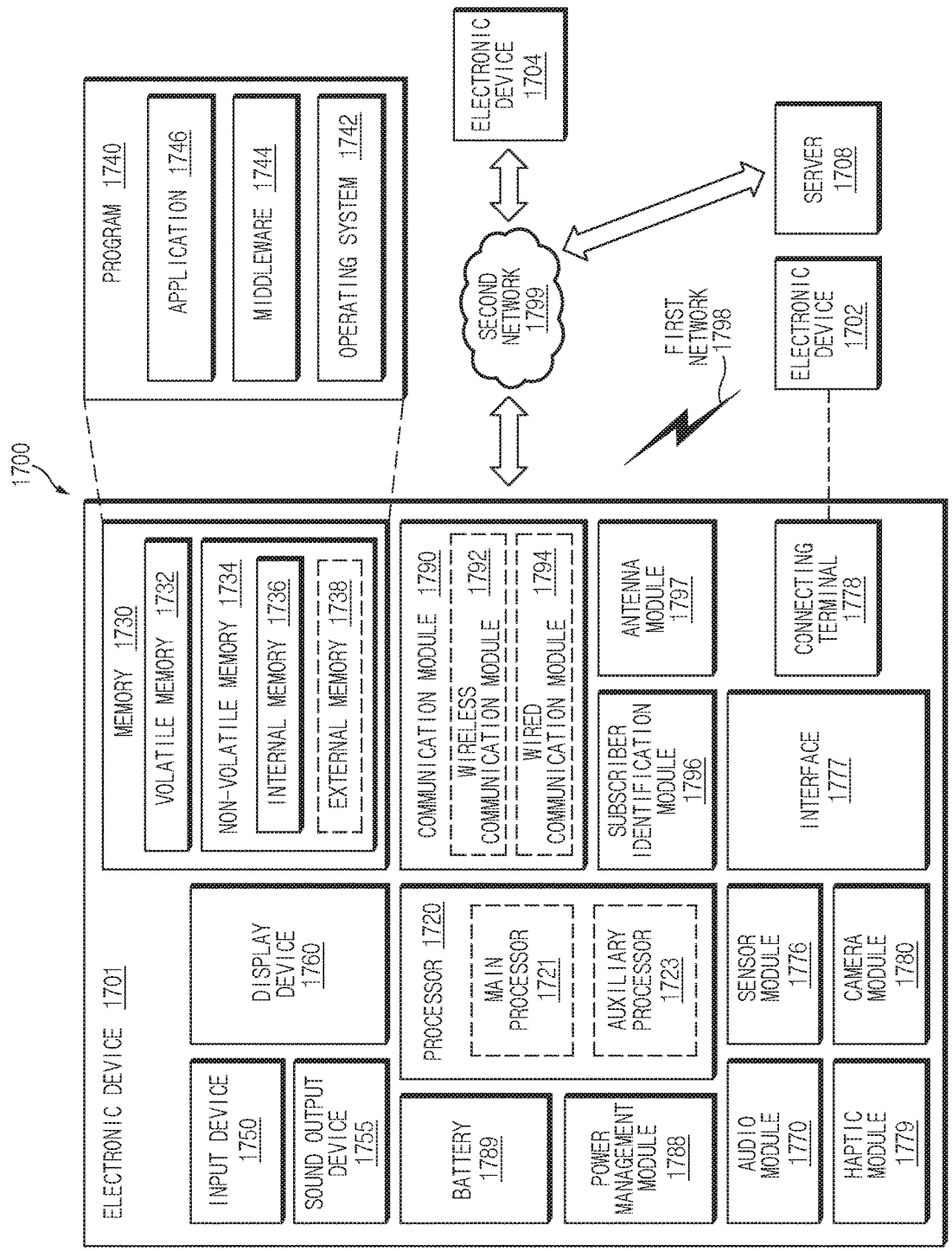
FIG. 17 is a block diagram illustrating an electronic device in a network environment according to an embodiment of the disclosure.

FIG. 17 is a block diagram illustrating an electronic device 1701 in a network environment 1700 according to an embodiment of the disclosure. Referring to FIG. 17, the electronic device 1701 in the network environment 1700 may communicate with an electronic device 1702 via a first network 1798 (e.g., a short-range wireless communication network), or an electronic device 1704 or a server 1708 via a second network 1799 (e.g., a long-range wireless communication network). According to an embodiment, the electronic device 1701 may communicate with the electronic device 1704 via the server 1708. According to an embodiment, the electronic device 1701 may include a processor 1720, memory 1730, an input device 1750, a sound output device 1755, a display device 1760, an audio module 1770, a sensor module 1776, an interface 1777, a haptic module 1779, a camera module 1780, a power management module 1788, a battery 1789, a communication module 1790, a subscriber identification module (SIM) 1796, or an antenna module 1797. In some embodiments, at least one (e.g., the display device 1760 or the camera module 1780) of the components may be omitted from the electronic device 1701, or one or more other components may be added in the electronic device 1701. In some embodiments, some of the components may be implemented as single integrated circuitry. For example, the sensor module 1776 (e.g., a fingerprint sensor, an iris sensor, or an illuminance sensor) may be implemented as embedded in the display device 1760 (e.g., a display).

The processor 1720 may execute, for example, software (e.g., a program 1740) to control at least one other component (e.g., a hardware or software component) of the electronic device 1701 coupled with the processor 1720, and may perform various data processing or computation. According to one embodiment, as at least part of the data processing or computation, the processor 1720 may load a command or data received from another component (e.g., the sensor module 1776 or the communication module 1790) in volatile memory 1732, process the command or the data stored in the volatile memory 1732, and store resulting data in non-volatile memory 1734. According to an embodiment, the processor 1720 may include a main processor 1721 (e.g., a central processing unit (CPU) or an application processor (AP)), and an auxiliary processor 1723 (e.g., a graphics processing unit (GPU), an image signal processor (ISP), a sensor hub processor, or a communication processor (CP)) that is operable independently from, or in conjunction with, the main processor 1721. Additionally or alternatively, the auxiliary processor 1723 may be adapted to consume less power than the main processor 1721, or to be specific to a specified function. The auxiliary processor 1723 may be implemented as separate from, or as part of the main processor 1721.

The auxiliary processor 1723 may control at least some of functions or states related to at least one component (e.g., the display device 1760, the sensor module 1776, or the communication module 1790) among the components of the electronic device 1701, instead of the main processor 1721 while the main processor 1721 is in an inactive (e.g., sleep) state, or together with the main processor 1721 while the main processor 1721 is in an active state (e.g., executing an application). According to an embodiment, the auxiliary processor 1723 (e.g., an image signal processor or a communication processor) may be implemented as part of another component (e.g., the camera module 1780 or the communication module 1790) functionally related to the auxiliary processor 1723.

The memory 1730 may store various data used by at least one component (e.g., the processor 1720 or the sensor module 1776) of the electronic device 1701. The various data may include, for example, software (e.g., the program 1740) and input data or output data for a command related thereto. The memory 1730 may include the volatile memory 1732 or the non-volatile memory 1734.

The program 1740 may be stored in the memory 1730 as software, and may include, for example, an operating system (OS) 1742, middleware 1744, or an application 1746.

The input device 1750 may receive a command or data to be used by another component (e.g., the processor 1720) of the electronic device 1701, from the outside (e.g., a user) of the electronic device 1701. The input device 1750 may include, for example, a microphone, a mouse, a keyboard, or a digital pen (e.g., a stylus pen).

The sound output device 1755 may output sound signals to the outside of the electronic device 1701. The sound output device 1755 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 1760 may visually provide information to the outside (e.g., a user) of the electronic device 1701. The display device 1760 may include, for example, a display, a hologram device, or a projector and control circuitry to control a corresponding one of the display, hologram device, and projector. According to an embodiment, the display device 1760 may include touch circuitry adapted to detect a touch, or sensor circuitry (e.g., a pressure sensor) adapted to measure the intensity of force incurred by the touch.

The audio module 1770 may convert a sound into an electrical signal and vice versa. According to an embodiment, the audio module 1770 may obtain the sound via the input device 1750, or output the sound via the sound output device 1755 or a headphone of an external electronic device (e.g., an electronic device 1702) directly (e.g., wiredly) or wirelessly coupled with the electronic device 1701.

The sensor module 1776 may detect an operational state (e.g., power or temperature) of the electronic device 1701 or an environmental state (e.g., a state of a user) external to the electronic device 1701, and then generate an electrical signal or data value corresponding to the detected state. According to an embodiment, the sensor module 1776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1777 may support one or more specified protocols to be used for the electronic device 1701 to be coupled with the external electronic device (e.g., the electronic device 1702) directly (e.g., wiredly) or wirelessly. According to an embodiment, the interface 1777 may include, for example, a high definition multimedia interface (HDMI), a universal serial bus (USB) interface, a secure digital (SD) card interface, or an audio interface.

A connecting terminal 1778 may include a connector via which the electronic device 1701 may be physically connected with the external electronic device (e.g., the electronic device 1702). According to an embodiment, the connecting terminal 1778 may include, for example, a HDMI connector, a USB connector, a SD card connector, or an audio connector (e.g., a headphone connector).

The haptic module 1779 may convert an electrical signal into a mechanical stimulus (e.g., a vibration or a movement) or electrical stimulus which may be recognized by a user via his tactile sensation or kinesthetic sensation. According to an embodiment, the haptic module 1779 may include, for example, a motor, a piezoelectric element, or an electric stimulator.

The camera module 1780 may capture a still image or moving images. According to an embodiment, the camera module 1780 may include one or more lenses, image sensors, image signal processors, or flashes.

The power management module 1788 may manage power supplied to the electronic device 1701. According to one embodiment, the power management module 1788 may be implemented as at least part of, for example, a power management integrated circuit (PMIC).

The battery 1789 may supply power to at least one component of the electronic device 1701. According to an embodiment, the battery 1789 may include, for example, a primary cell which is not rechargeable, a secondary cell which is rechargeable, or a fuel cell.

The communication module 1790 may support establishing a direct (e.g., wired) communication channel or a wireless communication channel between the electronic device 1701 and the external electronic device (e.g., the electronic device 1702, the electronic device 1704, or the server 1708) and performing communication via the established communication channel. The communication module 1790 may include one or more communication processors that are operable independently from the processor 1720 (e.g., the application processor (AP)) and supports a direct (e.g., wired) communication or a wireless communication. According to an embodiment, the communication module 1790 may include a wireless communication module 1792 (e.g., a cellular communication module, a short-range wireless communication module, or a global navigation satellite system (GNSS) communication module) or a wired communication module 1794 (e.g., a local area network (LAN) communication module or a power line communication (PLC) module). A corresponding one of these communication modules may communicate with the external electronic device via the first network 1798 (e.g., a short-range communication network, such as Bluetooth™, wireless-fidelity (Wi-Fi) direct, or infrared data association (IrDA)) or the second network 1799 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1792 may identify and authenticate the electronic device 1701 in a communication network, such as the first network 1798 or the second network 1799, using subscriber information (e.g., international mobile subscriber identity (IMSI)) stored in the subscriber identification module 1796.

The antenna module 1797 may transmit or receive a signal or power to or from the outside (e.g., the external electronic device) of the electronic device 1701. According to an embodiment, the antenna module 1797 may include an antenna including a radiating element composed of a conductive material or a conductive pattern formed in or on a substrate (e.g., PCB). According to an embodiment, the antenna module 1797 may include a plurality of antennas, In such a case, at least one antenna appropriate for a communication scheme used in the communication network, such as the first network 1798 or the second network 1799, may be selected, for example, by the communication module 1790 (e.g., the wireless communication module 1792) from the plurality of antennas. The signal or the power may then be transmitted or received between the communication module 1790 and the external electronic device via the selected at least one antenna. According to an embodiment, another component (e.g., a radio frequency integrated circuit (RFIC)) other than the radiating element may be additionally formed as part of the antenna module 1797.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1701 and the external electronic device 1704 via the server 1708 coupled with the second network 1799. Each of the electronic devices 1702 and 1704 may be a device of a same type as, or a different type, from the electronic device 1701. According to an embodiment, all or some of operations to be executed at the electronic device 1701 may be executed at one or more of the external electronic devices 1702, 1704, or 1708. For example, if the electronic device 1701 should perform a function or a service automatically, or in response to a request from a user or another device, the electronic device 1701, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1701. The electronic device 1701 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1740) including one or more instructions that are stored in a storage medium (e.g., internal memory 1736 or external memory 1738) that is readable by a machine (e.g., the electronic device 1701). For example, a processor (e.g., the processor 1720) of the machine (e.g., the electronic device 1701) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to the embodiments of the disclosure, the size of the aperture cover of the camera module may be decreased.

Furthermore, according to the embodiments of the disclosure, the size of the external decoration may also be decreased with the decrease in the size of the aperture cover.

In addition, the disclosure may provide various effects that are directly or indirectly recognized.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A camera module comprising:
   a housing assembly;
   a lens assembly disposed in the housing assembly, the lens assembly comprising at least one lens; and
   an aperture module configured to adjust an amount of external light incident on the at least one lens,
   wherein the aperture module comprises:
      an aperture base comprising a base opening through which the at least one lens is exposed when viewed from above the at least one lens,
      an aperture slider disposed on one side surface of the aperture base and configured to perform a sliding motion along a specified path,
      an aperture lever rotatably coupled to the aperture base about an axis of rotation and configured to rotate through a specified angle based on the sliding motion of the aperture slider, and
      a plurality of aperture blades configured to move toward or away from each other based on a rotation of the aperture lever,
   wherein opposite ends of the aperture lever are connected to the plurality of aperture blades, and at least a portion between the opposite ends of the aperture lever is connected to the aperture slider to move together with the aperture slider, and
   wherein the amount of external light incident on the at least one lens is adjusted by movement of the plurality of aperture blades.

2. The camera module of claim 1,
   wherein the aperture module further comprises an aperture magnet member coupled to the aperture slider,
   wherein the housing assembly comprises an aperture coil facing the aperture magnet member,
   wherein the aperture coil is configured to output an electromagnetic force based on an input signal, and
   wherein the aperture slider moves forward and backward along the specified path based on the electromagnetic force output from the aperture coil.

3. The camera module of claim 2, further comprising:
   control circuitry,
   wherein the housing assembly further comprises an aperture Hall sensor configured to sense a magnetic force of the aperture magnet member, and
   wherein the control circuitry is configured to:
      based on the magnetic force of the aperture magnet member sensed via the aperture Hall sensor, determine a position of the aperture magnet member, and
      based on the position of the aperture magnet member, generate a signal to be input to the aperture coil for controlling the movement of the plurality of aperture blades.

4. The camera module of claim 1, wherein the aperture lever further comprises:
   a central portion configured to serve as the axis of rotation;
   a first protrusion protruding from an end of a first arm in a direction of the axis of rotation, the first arm extending from the central portion to one side;
   a second protrusion protruding from an end of a second arm in the direction of the axis of rotation, the second arm extending from the central portion and facing away from the first arm; and
   a third protrusion protruding from the central portion toward the aperture slider.

5. The camera module of claim 4,
   wherein the aperture slider comprises a lever recess connected with the third protrusion, and
   wherein, in case the aperture slider performs the sliding motion, the third protrusion integrally moves together with the aperture slider and rotates about the axis of rotation in the lever recess.

6. The camera module of claim 4,
   wherein, in case the aperture slider moves to a first position, the first protrusion rotates to approach the aperture slider and the second protrusion rotates to move away from the aperture slider, and
   wherein, in case the aperture slider moves to a second position, the first protrusion rotates to move away from the aperture slider and the second protrusion rotates to approach the aperture slider.

7. The camera module of claim 4,
   wherein the aperture base further comprises a lever holder formed between the base opening and the aperture slider, and
   wherein the central portion of the aperture lever is fixed to the lever holder to be rotatable.

8. The camera module of claim 4,
   wherein the plurality of aperture blades comprise a first aperture blade and a second aperture blade,
   wherein the first aperture blade is connected to the first protrusion through a first slot, and
   wherein the second aperture blade is connected to the second protrusion through a second slot.

9. The camera module of claim 8,
   wherein, in case the aperture slider moves to a first position, the first aperture blade, among the plurality of aperture blades, moves rectilinearly toward the aperture slider and the second aperture blade, among the plurality of aperture blades, moves rectilinearly away from the aperture slider, and
   wherein, in case the aperture slider moves to a second position, the first aperture blade moves rectilinearly away from the aperture slider and the second aperture blade moves rectilinearly toward the aperture slider.

10. The camera module of claim 9, wherein, in case the aperture slider stops at the first position, the first aperture blade and the second aperture blade overlap each other and form a first aperture opening having a first area.

11. The camera module of claim 10, wherein, in case the aperture slider stops at the second position, the first aperture blade and the second aperture blade overlap each other and form a second aperture opening having a second area larger than the first area.

12. The camera module of claim 11, wherein, in case the aperture slider moves between the first position and the second position, a length of one side of an aperture opening formed by the first aperture blade and the second aperture blade is linearly changed.

13. The camera module of claim 1,
wherein the aperture base further comprises a slide rail formed on a side surface on which the aperture lever is disposed, and
wherein the aperture slider performs the sliding motion on the slide rail.

14. The camera module of claim 13, wherein a length of at least one side of each of the plurality of aperture blades is limited based on a size of the slide rail that corresponds to a direction in which the aperture slider performs the sliding motion.

15. The camera module of claim 13,
wherein the aperture module further comprises at least one slide ball disposed between the slide rail and the aperture slider,
wherein the slide rail and the aperture slider comprise at least one guide groove on side surfaces facing each other, and
wherein, in case the aperture slider performs the sliding motion, the slide ball is disposed in the guide groove and performs a rolling motion.

16. A camera module comprising:
a housing assembly;
a carrier assembly disposed in the housing assembly, the carrier assembly being configured to move forward and backward in a first direction;
a lens assembly disposed in the carrier assembly, the lens assembly comprising at least one lens arranged in the first direction; and
an aperture module configured to adjust an amount of external light incident on the at least one lens,
wherein the aperture module comprises:
an aperture base comprising a base opening through which the at least one lens is exposed when viewed from above the at least one lens,
an aperture slider disposed on one side surface of the aperture base and configured to perform a sliding motion in a second direction perpendicular to the first direction,
an aperture lever rotatably coupled to the aperture base about an axis of rotation and configured to rotate through a specified angle based on the sliding motion of the aperture slider, and
a plurality of aperture blades configured to move toward or away from each other in a third direction based on a rotation of the aperture lever, the third direction being perpendicular to the first direction and different from the second direction,
wherein opposite ends of the aperture lever are connected to the plurality of aperture blades, and at least a portion between the opposite ends of the aperture lever is connected to the aperture slider to move together with the aperture slider, and
wherein the amount of external light incident on the at least one lens is adjusted by movement of the plurality of aperture blades in the third direction.

17. The camera module of claim 16, further comprising:
control circuitry,
wherein the aperture module further comprises an aperture magnet member coupled to the aperture slider,
wherein the housing assembly comprises an aperture coil facing the aperture magnet member, the aperture coil being configured to output an electromagnetic force based on an input signal, and
wherein the control circuitry is configured to, based on the electromagnetic force output from the aperture coil, control the aperture coil such that the aperture slider stops at a specified position.

18. The camera module of claim 17,
wherein the carrier assembly comprises:
a first carrier configured to move forward and backward in the second direction or the third direction, and
a second carrier configured to accommodate the first carrier and move forward and backward in the first direction in the housing assembly,
wherein the first carrier comprises:
a first magnet member associated with the forward and backward movement in the second direction, and
a second magnet member associated with the forward and backward movement in the third direction, and
wherein the second carrier comprises a third magnet member associated with the forward and backward movement in the first direction.

19. The camera module of claim 18,
wherein the housing assembly further comprises:
a first coil facing the first magnet member,
a first Hall sensor configured to measure an electromagnetic force of the first magnet member,
a second coil facing the second magnet member,
a second Hall sensor configured to measure an electromagnetic force of the second magnet member,
a third coil facing the third magnet member, and
a third Hall sensor configured to measure an electromagnetic force of the third magnet member, and
wherein the control circuitry is further configured to:
based on sensing information received from at least one of the first Hall sensor, the second Hall sensor, or the third Hall sensor, determine a position of at least one of the first magnet member, the second magnet member, or the third magnet member, and
based on the position of at least one of the first magnet member, the second magnet member, or the third magnet member, control at least one of the first coil, the second coil, or the third coil to control the forward and backward movement of the first carrier or the second carrier.

20. The camera module of claim 19,
wherein the first coil operates in conjunction with the first magnet member to actuate movement of the lens assembly in an X-axis direction,
wherein the second coil operates in conjunction with the second magnet member to actuate movement of the lens assembly in a Y-axis direction, and
wherein the third coil operates in conjunction with the third magnet member to actuate movement of the lens assembly in a Z-axis direction.

* * * * *